United States Patent
Kitai

(10) Patent No.: US 9,823,884 B2
(45) Date of Patent: Nov. 21, 2017

(54) INSPECTION SYSTEM, PRINTER, AND PRINT-POSITION NOTIFICATION METHOD

(71) Applicant: Tadashi Kitai, Kanagawa (JP)

(72) Inventor: Tadashi Kitai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/219,143

(22) Filed: Jul. 25, 2016

(65) Prior Publication Data

US 2017/0031636 A1  Feb. 2, 2017

(30) Foreign Application Priority Data

Jul. 28, 2015  (JP) ................ 2015-148872

(51) Int. Cl.
| | |
|---|---|
| *G06F 15/00* | (2006.01) |
| *G06F 3/12* | (2006.01) |
| *G06K 15/02* | (2006.01) |
| *G06K 9/00* | (2006.01) |
| *G06K 1/00* | (2006.01) |

(52) U.S. Cl.
CPC .......... *G06F 3/1208* (2013.01); *G06F 3/1237* (2013.01); *G06K 9/00442* (2013.01); *G06K 15/027* (2013.01); *H04N 2201/0081* (2013.01)

(58) Field of Classification Search
CPC . G06F 3/1208; G06F 3/1237; G06G 15/5062; G06K 15/027; G06K 9/00442; H04N 2201/0081
USPC .................................................. 358/1.1–1.18
See application file for complete search history.

(56) References Cited

U.S. PATENT DOCUMENTS

| | | | | |
|---|---|---|---|---|
| 2010/0097624 A1* | 4/2010 | Hirakawa | .......... | G03G 15/5062 358/1.12 |
| 2011/0052078 A1* | 3/2011 | Yamakawa | ............ | G06K 9/036 382/199 |
| 2013/0044342 A1* | 2/2013 | Kaneko | .................. | B41J 2/2135 358/1.13 |
| 2013/0044347 A1* | 2/2013 | Kitai | .................... | H04N 1/4092 358/1.14 |
| 2013/0250370 A1* | 9/2013 | Kojima | .............. | H04N 1/00005 358/405 |

(Continued)

FOREIGN PATENT DOCUMENTS

| | | | | |
|---|---|---|---|---|
| JP | 2012-093601 | | 5/2012 | |
| JP | EP 2575349 A1 * | | 4/2013 | .......... H04N 1/4095 |
| JP | 2014-198465 | | 10/2014 | |

*Primary Examiner* — Gabriel Garcia
(74) *Attorney, Agent, or Firm* — Duft Bornsen & Fettig LLP

(57) ABSTRACT

An inspection system includes an inspection apparatus configured to examine, for each print, whether a defect has occurred on at least one print side of the print based on a read image of the at least one print side and an image that correspond to a read image, and configured to notify a printer of sheet identification information about a sheet on which an original image of a certain page is printed, the original image being out of original images for one or more pages including an original image formed on a print side on which the defect has occurred; and the printer configured to print, based on the notified sheet identification information and sheet identification information about a sheet on which a position notification image that indicates a positional relation with a print on which the original image of the certain page is formed, the position notification image.

11 Claims, 17 Drawing Sheets

(56) References Cited

U.S. PATENT DOCUMENTS

| | | | |
|---|---|---|---|
| 2014/0079292 A1* | 3/2014 | Kaneko | G06T 7/0002 |
| | | | 382/112 |
| 2014/0270396 A1 | 9/2014 | Miyagawa et al. | |
| 2014/0285852 A1* | 9/2014 | Aikawa | G06K 15/1872 |
| | | | 358/3.24 |
| 2014/0314281 A1* | 10/2014 | Kojima | G06T 7/0008 |
| | | | 382/112 |

* cited by examiner

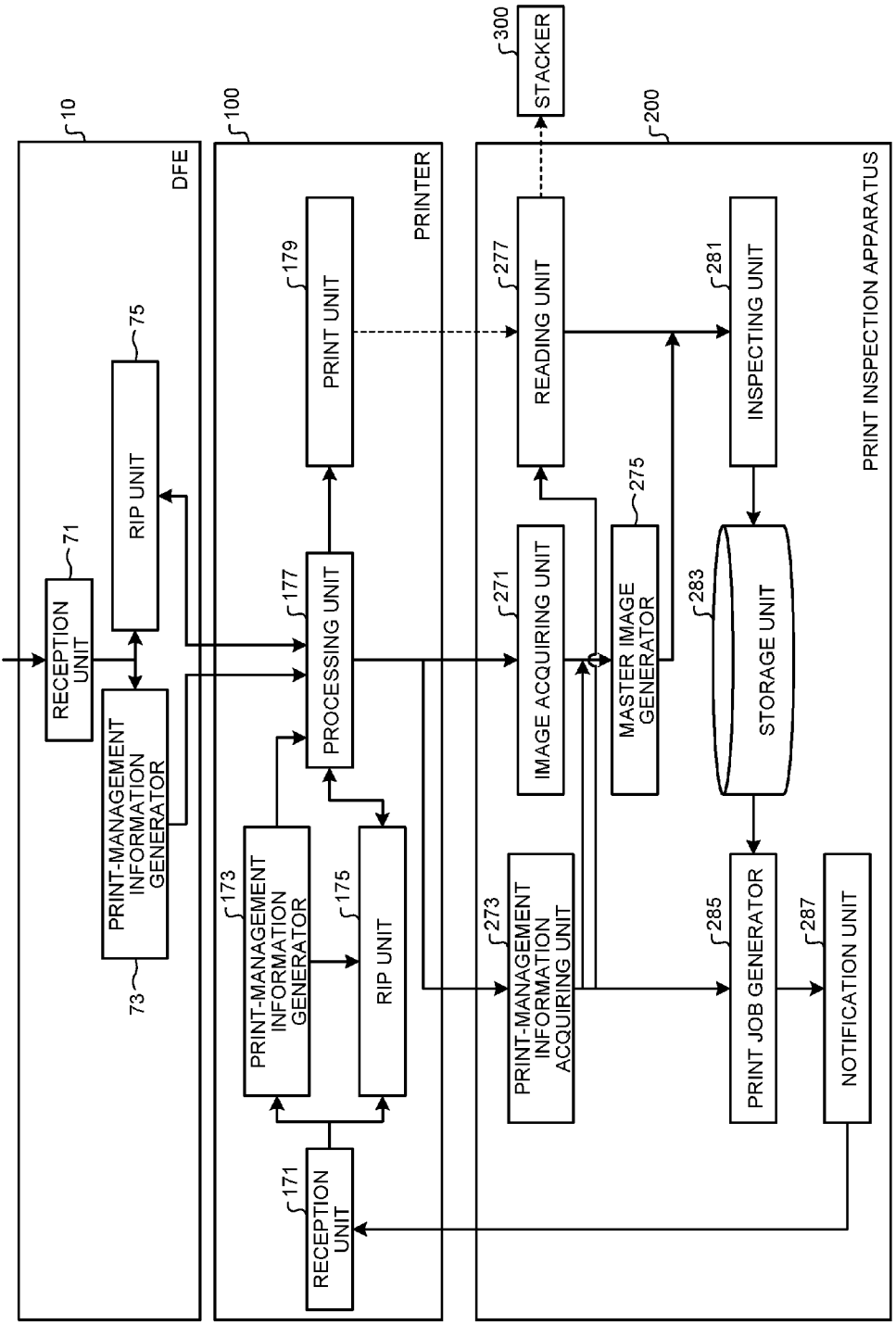

FIG.7

| ITEMS | REMARKS | VALUES |
|---|---|---|
| GENERATION SOURCE | DFE, INSIDE | |
| GENERATION TIME | GENERATION TIME OF PRINT MANAGEMENT INFORMATION | |
| PAGE ID | IDENTIFICATION INFORMATION ABOUT PRINT PAGE, +1 FOR EACH OUTPUT OF 1 PAGE FROM POWER ON | |
| PRINT SIDE | SINGLE-SIDED, DOUBLE-SIDED FRONT, DOUBLE-SIDED REAR | |
| SHEET ID | IDENTIFICATION INFORMATION ABOUT SHEET, +1 FOR EACH OUTPUT OF 1 SHEET FROM POWER ON | |
| SET ID | IDENTIFICATION INFORMATION ON SET BY SET BASIS, +1 FOR EACH COMPLETION OF OUTPUT OF 1 SET FROM POWER ON | |
| JOB ID | IDENTIFICATION INFORMATION ON JOB BY JOB BASIS, +1 FOR EACH COMPLETION OF OUTPUT OF 1 JOB FROM POWER ON | |
| PAPER TYPE | TYPE OF PAPER | |
| PAPER SIZE | SIZE OF PAPER | |
| PAGE | INFORMATION ON PAGE NUMBER IN SET | |
| NUMBER OF PAGES | INFORMATION ON NUMBER OF PAGES IN SET | |
| SET | INFORMATION ON SET NUMBER IN SETS OUTPUT IN PRINT JOB | |
| NUMBER OF SETS | INFORMATION ON NUMBER OF SETS OUTPUT IN PRINT JOB | |
| JOB PRIORITY | PRIORITY IN PRINT JOB, SMALLER NUMBER MEANS HIGHER PRIORITY<br>0 THROUGH 9: OUTPUT AT NEXT BREAK BETWEEN PAGES AVAILABLE TO OUTPUT<br>10 THROUGH 19: OUTPUT AT NEXT BREAK BETWEEN SETS AVAILABLE TO OUTPUT<br>20 THROUGH 29: OUTPUT AT NEXT BREAK BETWEEN JOBS AVAILABLE TO OUTPUT<br>30 OR MORE: OUTPUT AT NEXT TIMING AVAILABLE TO OUTPUT | |
| JOB STATUS | UNPROCESSED: PRINT PROCESS NOT YET PROCESSED<br>IN-PRINT: PRINT PROCESS FINISHED, PAPER EJECTION NOT COMPLETED<br>PRINT COMPLETION (WITHOUT DEFECTS): PRINT PROCESS FINISHED, PAPER EJECTION COMPLETED, NO DEFECTS<br>PRINT COMPLETION (WITH DEFECTS): PRINT PROCESS FINISHED, PAPER EJECTION COMPLETED, DEFECTS PRESENT<br>PAPER JAM: PRINT PROCESS FINISHED, PAPER JAMMED | |
| POSITON-NOTIFICATION PRINT CATEGORY | CATEGORY OF POSITION NOTIFICATION PRINT<br>OFF<br>PER PAGE<br>PER SET<br>PER JOB | |
| POSITION-NOTIFICATION TARGET SHEET ID | SHEET ID OF POSITION NOTIFICATION TARGET | |
| ⋮ | ⋮ | ⋮ |

FIG.8

| PAGE ID | SHEET ID | PRINT SIDE | POSITIONAL DISPLACEMENT IN X DIRECTION | POSITIONAL DISPLACEMENT IN Y DIRECTION | NUMBER OF OCCURRED DEFECTS | NUMBER OF DEFECT CANDIDATES | PAGE DEFECT DETERMINATION |
|---|---|---|---|---|---|---|---|
| 1 | 1 | DOUBLE-SIDED FRONT | 5 | -1 | 0 | 64 | PAGE DEFECT |
| 2 | 1 | DOUBLE-SIDED REAR | 4 | 0 | 0 | 0 | PAGE DEFECT |
| 3 | 2 | DOUBLE-SIDED FRONT | -1 | 2 | 33 | 54 | NONE |
| ... | ... | ... | ... | ... | ... | ... | ... |

FIG.9

| DEFECT ID | DEFECT CATEGORY | DEFECT DETERMINA- TION RESULT | UPPER-LEFT X COORDINATE | UPPER-LEFT Y COORDINATE | X SIZE | Y SIZE | AREA | DEFECT DETERMINATION VALUE |
|---|---|---|---|---|---|---|---|---|
| 1 | DOT DEFECT | DEFECT | 52 | 150 | 5 | 3 | 8 | 480 |
| 2 | LINE DEFECT | CANDIDATE | 1503 | 200 | 5 | 50 | 26 | 380 |
| 3 | SURFACE DEFECT | CANDIDATE | 123 | 822 | 20 | 10 | 56 | 260 |
| ... | ... | ... | ... | ... | ... | ... | ... | ... |

INSPECTION SYSTEM, PRINTER, AND PRINT-POSITION NOTIFICATION METHOD

CROSS-REFERENCE TO RELATED APPLICATIONS

The present application claims priority under 35 U.S.C. §119 to Japanese Patent Application No. 2015-148872, filed Jul. 28, 2015. The contents of which are incorporated herein by reference in their entirety.

BACKGROUND OF THE INVENTION

1. Field of the Invention

The present invention relates to an inspection system, a printer, and a print-position notification method.

2. Description of the Related Art

In printing such as production printing that high quality is requested, quality inspection for prints is requested. For example, known has been a print inspection system that compares a master image generated from an original image of a generation source of a print and a read image generated by electrically reading the print to inspect the quality of the print.

When the print inspection system is not provided with a mechanism in which a good print that satisfies a certain quality and a defective print that does not satisfy the certain quality can be ejected into separate discharge trays, both good prints and defective prints are to be ejected to the same discharge tray and stacked being mixed.

Because there may be a case in which it is difficult to determine at a glance whether a print is a good print or a defective print, it is not easy to find an intended print such as a defective print under the situation that good prints and defective prints are stacked being mixed in the discharge tray.

To cope with such a problem, Japanese Unexamined Patent Application Publication No. 2014-198465 discloses a technology that arranges a plurality of light emitting diodes (LEDs) in the direction in which prints are stacked in a stacker provided with a discharge tray and lights the LED at the place where an intended print is located to report the location of the intended print.

However, in such a conventional technology in the foregoing, a dedicated mechanism such as LEDs is necessary for the notification of the location of a certain print. Thus, the technology is not applicable to an inspection system not having such a mechanism.

SUMMARY OF THE INVENTION

According to one aspect of the present invention, an inspection system includes: a printer and an inspection apparatus. The printer includes a print unit configured to print original images for N (N≥1) pages on M (M≥1) sheets to generate M prints. The inspection apparatus includes an image acquiring unit, a print-management information acquiring unit, a reading unit, an inspecting unit, and a notification unit. The image acquiring unit is configured to acquire the original images for N pages from the printer. The print-management information acquiring unit is configured to acquire, for each of the original images, print management information including sheet identification information identifying a sheet on which the original image is printed, from the printer. The reading unit is configured to read, for each of the prints, one or more print sides of the print to generate one or more read images. The inspecting unit is configured to examine, for each of the prints, whether a defect has occurred on at least one of the one or more print sides of the print based on the one or more read images and one or more original images that correspond to the one or more read images. The notification unit is configured to notify the printer of sheet identification information about a sheet on which an original image of a certain page is printed, the original image being out of original images for one or more pages including an original image formed on a print side on which the defect has occurred. The print unit is configured to print, based on the notified sheet identification information and sheet identification information about a sheet on which a position notification image that indicates a positional relation with a print on which the original image of the certain page is formed, the position notification image on the sheet to generate a position notification print.

BRIEF DESCRIPTION OF THE DRAWINGS

FIG. 6 is a block diagram illustrating one example of a functional configuration of the DFE, the printer, and the print inspection apparatus in the embodiment;

FIG. 7 is a table illustrating one example of print management information in the embodiment;

FIG. 8 is a table illustrating one example of inspection result information stored in a storage unit in the embodiment;

FIG. 9 is a table illustrating one example of defect information stored in the storage unit as a part of the inspection result information in the embodiment;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENT

Figure 1:
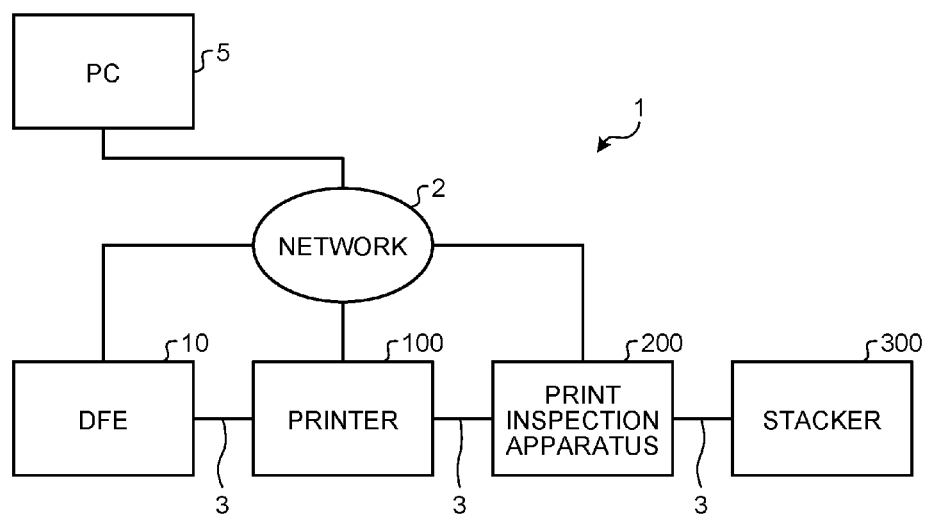
FIG. 1 is a block diagram illustrating one example of a configuration of a print inspection system according to an embodiment.

The terminology used herein is for the purpose of describing particular embodiments only and is not intended to be limiting of the present invention.

As used herein, the singular forms "a", "an" and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

With reference to the accompanying drawings, the following describes in detail an exemplary embodiment of an inspection system, a printer, and a print-position notification method according to the present invention.

An embodiment has an object to provide an inspection system, a printer, and a print-position notification method that enable the user to easily understand the location of the print without having a dedicated mechanism.

FIG. 1 is a block diagram illustrating one example of a configuration of a print inspection system 1 (one example of an inspection system) in the embodiment. As illustrated in FIG. 1, the print inspection system 1 includes a personal computer (PC) 5, a digital front end (DFE) 10, a printer 100, a print inspection apparatus 200 (one example of an inspection apparatus), and a stacker 300 (one example of a stacking apparatus).

The PC 5, the DFE 10, the printer 100, and the print inspection apparatus 200 are coupled to one another via a network 2. The network 2 can be implemented by a local area network (LAN) and the like, for example.

Furthermore, the DFE 10 and the printer 100, the printer 100 and the print inspection apparatus 200, and the print inspection apparatus 200 and the stacker 300 are coupled to each other with respective communication lines (communication cables) 3 for dedicated interfaces. Examples of the dedicated interfaces include peripheral component interconnect express (PCIe) and universal serial bus (USB), for example. The dedicated interfaces, however, are not limited thereto.

The connection form among the PC 5, the DFE 10, the printer 100, the print inspection apparatus 200, and the stacker 300, however, is not limited to the foregoing.

Figure 2:
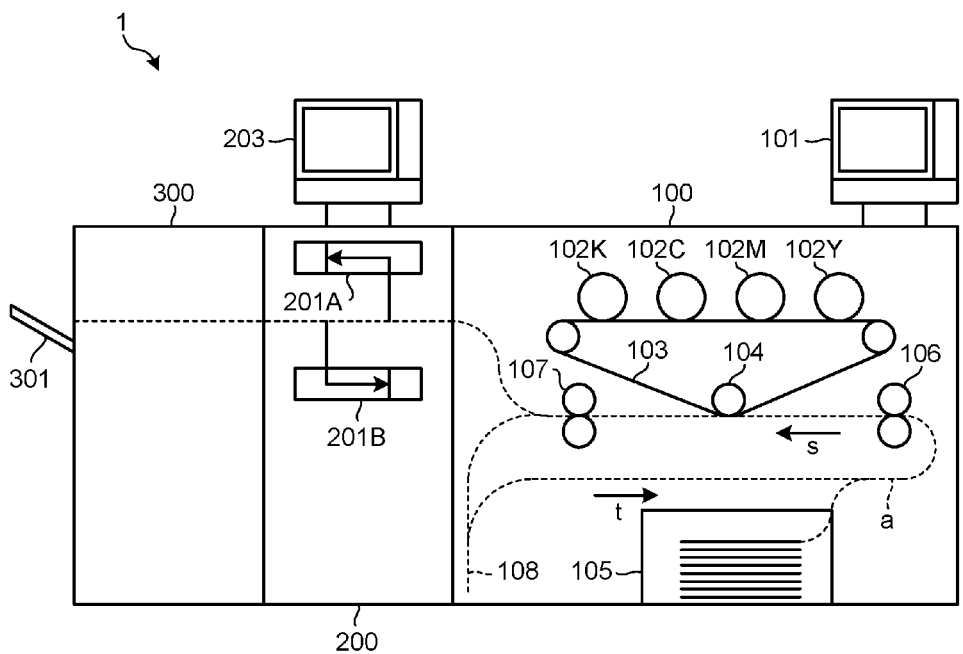
FIG. 2 is a schematic view illustrating one example of a printer, a print inspection apparatus, and a stacker in the embodiment.

FIG. 2 is a schematic view illustrating one example of the printer 100, the print inspection apparatus 200, and the stacker 300 in the embodiment.

As illustrated in FIG. 2, the printer 100 includes an operation panel 101, photoconductor drums 102Y, 102M, 102C, and 102K, a transfer belt 103, a secondary transfer roller 104, a paper feeding unit 105, a pair of carriage rollers 106, a fixing roller 107, and an inversion path 108.

The operation panel 101 is an operation display unit on which various operating inputs for the printer 100 are performed and various screens are displayed.

On each of the photoconductor drums 102Y, 102M, 102C, and 102K, a toner image is formed by performing an image forming process (charging process, exposure process, developing process, and cleaning process), and the formed toner image is then transferred onto the transfer belt 103. In the embodiment, it is assumed that a yellow toner image is formed on the photoconductor drum 102Y, a magenta toner image is formed on the photoconductor drum 102M, a cyan toner image is formed on the photoconductor drum 102C, and a black toner image is formed on the photoconductor drum 102K, which however is not limited thereto.

The transfer belt 103 conveys the toner images transferred being superimposed from the photoconductor drums 102Y, 102M, 102C, and 102K (a toner image in full color), to a secondary transfer position of the secondary transfer roller 104. In the embodiment, it is assumed that, on the transfer belt 103, the yellow toner image is transferred first, and then the magenta toner image, the cyan toner image, and the black toner image are transferred being superimposed in sequence, which however is not limited thereto.

The paper feeding unit 105 accommodates a plurality of sheets of paper being piled up and feeds the accommodated paper.

The pair of carriage rollers 106 conveys a sheet of paper fed from the paper feeding unit 105 in the direction of an arrow s on a conveying path a.

The secondary transfer roller 104 transfers in a lump the toner image in full color conveyed by the transfer belt 103 onto the sheet conveyed by the pair of carriage rollers 106, at the secondary transfer position.

The fixing roller 107 heats and presses the paper on which the toner image in full color was transferred to fix the toner image in full color onto the sheet.

The printer 100 ejects a print that is the sheet of paper on which the toner image in full color was fixed in the case of single-sided printing, to the print inspection apparatus 200. Meanwhile, the printer 100 sends to the inversion path 108 the sheet on which the toner image in full color was fixed in the case of double-sided printing.

The inversion path 108 performs switchback on the sheet to invert the front and rear sides of the sent sheet and conveys the sheet in the direction of an arrow t. The sheet conveyed by the inversion path 108 is conveyed again by the pair of carriage rollers 106. On the sheet, a toner image in full color is transferred onto the surface opposite to the surface at the previous time by the secondary transfer roller 104 and is fixed by the fixing roller 107. The sheet is then ejected to the print inspection apparatus 200 as a print.

As illustrated in FIG. 2, the print inspection apparatus 200 includes reading units 201A and 201B and an operation panel 203.

The operation panel 203 is an operation display unit on which various operating inputs for the print inspection apparatus 200 are performed and various screens are displayed. The operation panel 203 may be omitted. In that case, the operation panel 101 may be configured to double as the operation panel 203, or the PC 5 may be configured to double as the operation panel 203.

The reading unit 201A electrically reads one surface (front face, in the embodiment) of a print fed from the printer 100, and the reading unit 201B electrically reads the other surface (back face, in the embodiment) of the print. The reading units 201A and 201B can be implemented by a line scanner and the like, for example. The print inspection apparatus 200 then ejects the print for which the reading was completed, to the stacker 300.

The stacker 300 includes a tray 301 (one example of a stack unit). The stacker 300 stacks prints ejected by the print inspection apparatus 200 onto the tray 301.

Figure 3:
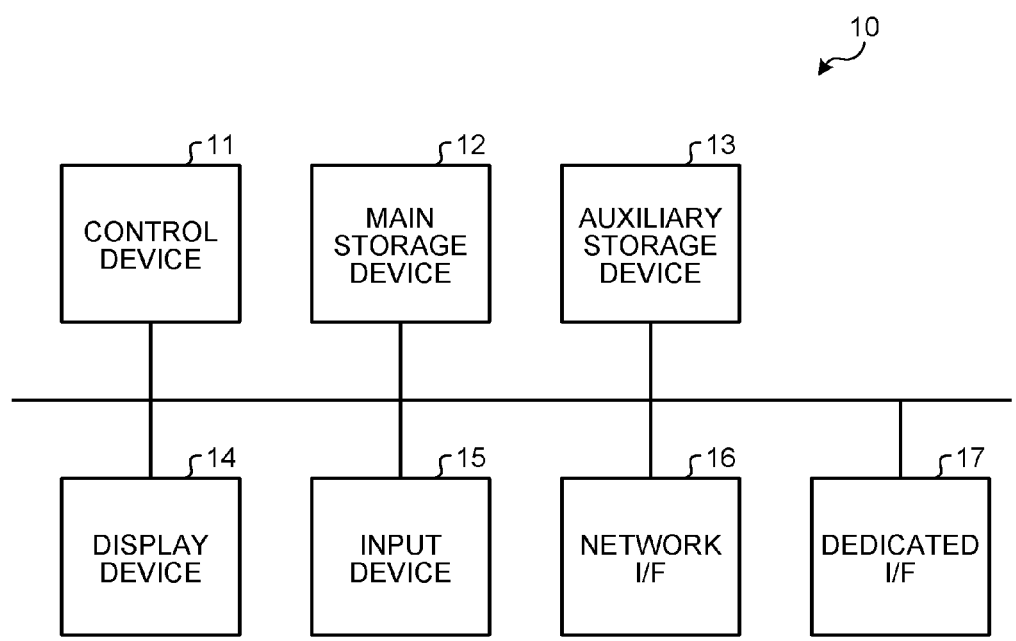
FIG. 3 is a block diagram illustrating one example of a hardware configuration of a DFE in the embodiment.

FIG. 3 is a block diagram illustrating one example of a hardware configuration of the DFE 10 in the embodiment. As illustrated in FIG. 3, the DFE 10 includes a control device 11 such as a central processing unit (CPU) and a graphics processing unit (GPU); a main storage device 12 such as a read only memory (ROM) and a random access memory (RAM); an auxiliary storage device 13 such as a hard disk drive (HDD) and a solid state drive (SSD); a display device 14 such as a display; an input device 15 such as a mouse, a keyboard, or a touch panel; a network interface (I/F) 16 for communication via the network 2; and a dedicated interface (I/F) 17 for communication via the communication line 3, and is of a hardware configuration using an ordinary computer. The auxiliary storage device 13, the display device 14, the input device 15, and the communication device 16 may be either built-in or external.

Figure 4:
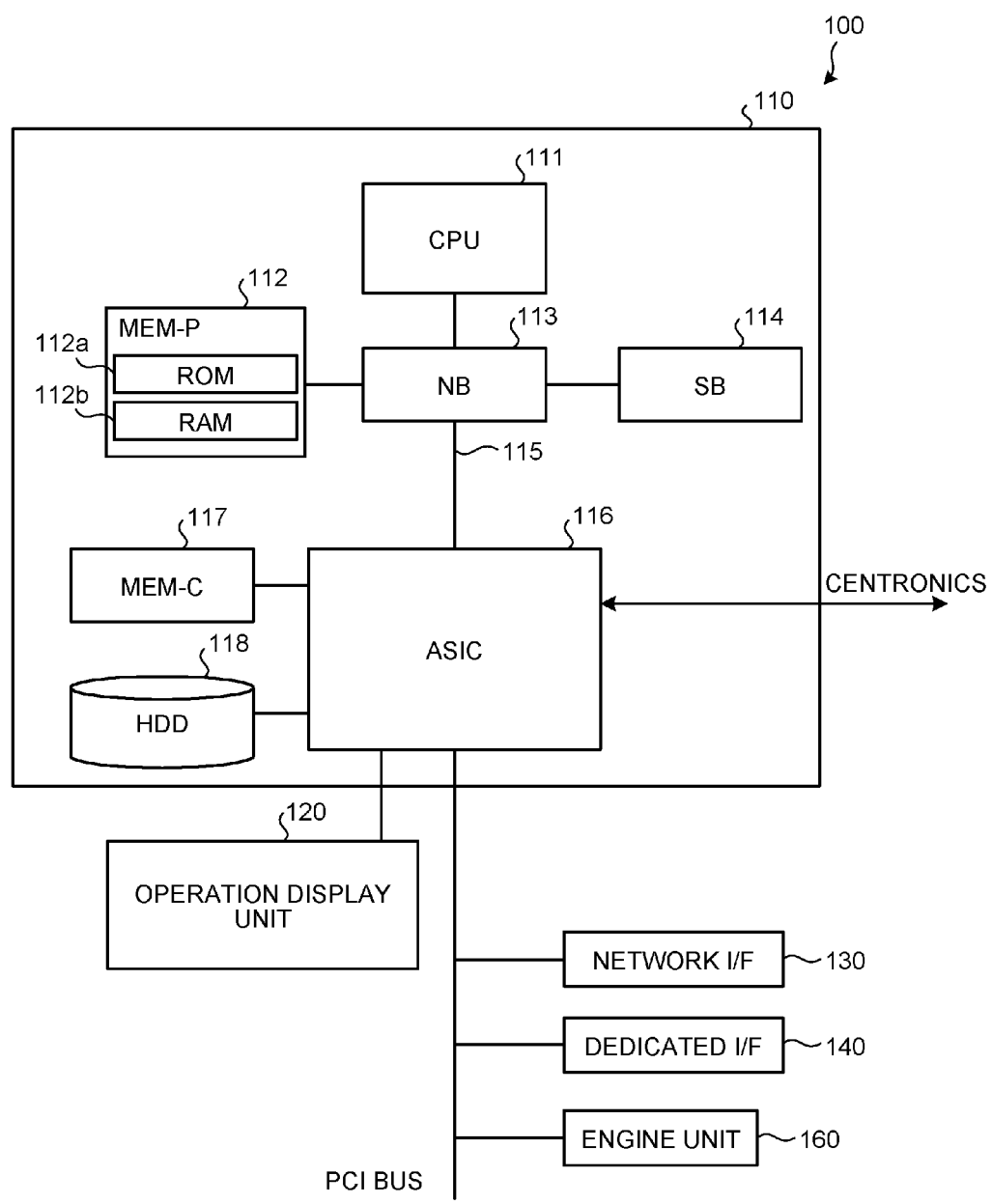
FIG. 4 is a block diagram illustrating one example of a hardware configuration of the printer in the embodiment.

FIG. 4 is a block diagram illustrating one example of a hardware configuration of the printer 100 in the embodiment. As illustrated in FIG. 4, the printer 100 is configured with a controller 110 and an engine unit 160 that are coupled via a PCI bus. The controller 110 is a controller that controls the control, drawing, and communication of a whole of the printer 100 and that controls inputs from an operation display unit 120. The engine unit 160 is an engine that can be coupled to the PCI bus, and is a scanner engine of a scanner and the like, for example. The engine unit 160 includes an image processing portion such as error diffusion and gamma conversion, in addition to the engine portion.

The controller 110 includes a CPU 111, a north bridge (NB) 113, a system memory (MEM-P) 112, a south bridge (SB) 114, a local memory (MEM-C) 117, an application specific integrated circuit (ASIC) 116, and an HDD 118, and is configured such that the north bridge (NB) 113 and the ASIC 116 are being coupled via an accelerated graphics port (AGP) bus 115. The MEM-P 112 further includes a ROM 112a and a RAM 112b.

The CPU 111 performs overall control of the printer 100; includes a chip set containing the NB 113, the MEM-P 112, and the SB 114; and is coupled to other devices via the chip set.

The NB 113 is a bridge to couple the CPU 111 to the MEM-P 112, the SB 114, and the AGP bus 115, and includes a PCI master, an AGP target, and a memory controller that controls reading and writing of the MEM-P 112.

The MEM-P 112 is a system memory used as a memory to store programs and data, a memory to load the programs and data, a memory for printer drawing, and others, and contains the ROM 112a and the RAM 112b. The ROM 112a is a read only memory used as a memory to store the programs and data, and the RAM 112b is a writable and readable memory used as a memory to load the programs and data, a memory for printer drawing, and others.

The SB 114 is a bridge to couple the NB 113 to the PCI devices and peripheral devices. The SB 114 is coupled to the NB 113 via the PCI bus, and on the PCI bus, a network interface (I/F) 130 for communication via the network 2, a dedicated interface (I/F) 140 for communication via the communication line 3, and others are also being coupled.

The ASIC 116 is an integrated circuit (IC) for an image processing purpose having hardware elements of image processing, and has a role of a bridge that connects each of the AGP bus 115, the PCI bus, the HDD 118, and the MEM-C 117. The ASIC 116 includes a PCI target and an AGP master, an arbiter (ARB) that forms the core of the ASIC 116, a memory controller that controls the MEM-C 117, a plurality of direct memory access controllers (DMACs) that perform rotation and such of image data by hardware logic and others, and a PCI unit that performs data transfer with the engine unit 160 via the PCI bus. The operation display unit 120 is directly coupled to the ASIC 116.

The MEM-C 117 is a local memory used as a copying image buffer and a code buffer, and the HDD 118 is a storage for the storage of image data, the storage of programs, the storage of font data, and the storage of forms.

The AGP bus 115 is a bus interface for a graphics accelerator card developed to speed up the graphics processing, and directly accesses the MEM-P 112 at a high throughput to make the graphics accelerator card fast.

Figure 5:
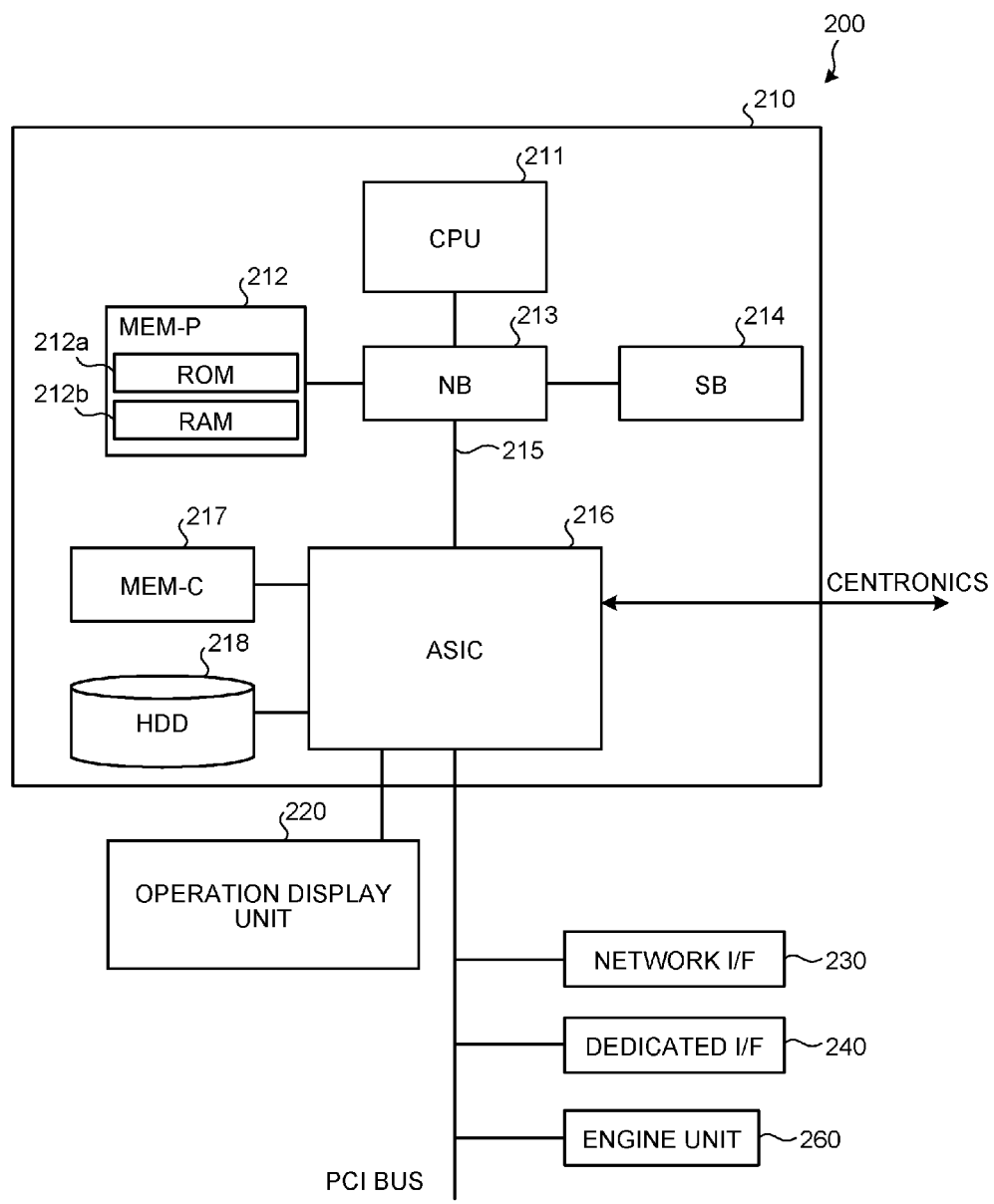
FIG. 5 is a block diagram illustrating one example of a hardware configuration of the print inspection apparatus in the embodiment.

FIG. 5 is a block diagram illustrating one example of a hardware configuration of the print inspection apparatus 200 in the embodiment. As illustrated in FIG. 5, the print inspection apparatus 200 is configured with a controller 210 and an engine unit 260 that are coupled via a PCI bus. The controller 210 is a controller that controls the control, drawing, and communication of a whole of the print inspection apparatus 200 and that controls inputs from an operation display unit 220. The engine unit 260 is an engine that can be coupled to the PCI bus, and is a scanner engine of a scanner and the like, for example. The engine unit 260 includes an image processing portion such as error diffusion and gamma conversion, in addition to the engine portion.

The controller 210 includes a CPU 211, a north bridge (NB) 213, a system memory (MEM-P) 212, a south bridge (SB) 214, a local memory (MEM-C) 217, an application-specific integrated circuit (ASIC) 216, and an HDD 218, and is configured such that the north bridge (NB) 213 and the ASIC 216 are being coupled via an accelerated graphics port (AGP) bus 215. The MEM-P 212 further includes a ROM 212a and a RAM 212b.

The CPU 211 performs overall control of the print inspection apparatus 200; includes a chip set containing the NB 213, the MEM-P 212, and the SB 214; and is coupled to other devices via the chip set.

The NB 213 is a bridge to couple the CPU 211 to the MEM-P 212, the SB 214, and the AGP bus 215, and includes a PCI master, an AGP target, and a memory controller that controls reading and writing of the MEM-P 212.

The MEM-P 212 is a system memory used as a memory to store programs and data, a memory to load the programs and data, a memory for printer drawing, and others, and includes the ROM 212a and the RAM 212b. The ROM 212a is a read only memory used as a memory to store the programs and data, and the RAM 212b is a writable and readable memory used as a memory to load the programs and data, a memory for printer drawing, and others.

The SB 214 is a bridge to couple the NB 213 to the PCI devices and peripheral devices. The SB 214 is coupled to the NB 213 via the PCI bus, and on the PCI bus, a network interface (I/F) 230 for communication via the network 2, a dedicated interface (I/F) 240 for communication via the communication line 3, and others are also being coupled.

The ASIC 216 is an integrated circuit (IC) for an image processing purpose having hardware elements of image processing, and has a role of a bridge that connects each of the AGP bus 215, the PCI bus, the HDD 218, and the MEM-C 217. The ASIC 216 includes a PCI target and an AGP master, an arbiter (ARB) that forms the core of the ASIC 216, a memory controller that controls the MEM-C 217, a plurality of direct memory access controllers (DMACs) that perform rotation and such of image data by hardware logic and others, and a PCI unit that performs data transfer with the engine unit 260 via the PCI bus. The operation display unit 220 is directly coupled to the ASIC 216.

The MEM-C 217 is a local memory used as a copying image buffer and a code buffer, and the HDD 218 is a storage for the storage of image data, the storage of programs, the storage of font data, and the storage of forms.

The AGP bus 215 is a bus interface for a graphics accelerator card developed to speed up the graphics processing, and directly accesses the MEM-P 212 at a high throughput to make the graphics accelerator card fast.

FIG. 6 is a block diagram illustrating one example of a functional configuration of the DFE 10, the printer 100, and the print inspection apparatus 200 in the embodiment.

As illustrated in FIG. 6, the DFE 10 includes a reception unit 71, a print-management information generator 73, and a raster image processing (RIP) unit 75.

The reception unit 71 can be implemented with the control device 11, the main storage device 12, the network I/F 16, and others, and the print-management information generator 73 and the RIP unit 75 can be implemented with the control device 11, the main storage device 12, the dedicated I/F 17, and others, for example. The RIP unit 75 may be implemented using, in combination, hardware such as an IC.

As illustrated in FIG. 6, the printer 100 includes a reception unit 171, a print-management information generator 173, a RIP unit 175 (one example of a position-notification image generator), a processing unit 177 (one example of an original-image output unit and a print-management information output unit), and a print unit 179.

The reception unit 171 can be implemented with the CPU 111, the system memory 112, the network I/F 130, and others, for example. The print-management information generator 173 and the RIP unit 175 can be implemented with the CPU 111, the system memory 112, and others, for example. The RIP unit 175 may be implemented using, in combination, hardware such as an IC. The processing unit 177 can be implemented with the CPU 111, the system memory 112, the dedicated I/F 140, and others, for example. The print unit 179 can be implemented with the photoconductor drums 102Y, 102M, 102C, and 102K, the transfer belt 103, the secondary transfer roller 104, the paper feeding unit 105, the pair of carriage rollers 106, the fixing roller 107, the engine unit 160, and others, for example.

As illustrated in FIG. 6, the print inspection apparatus 200 includes an image acquiring unit 271, a print-management information acquiring unit 273, a master image generator 275, a reading unit 277, an inspecting unit 281, a storage unit 283, a print job generator 285 (one example of a generation image generator), and a notification unit 287.

The image acquiring unit 271 and the print-management information acquiring unit 273 can be implemented with the CPU 211, the system memory 212, the dedicated I/F 240, and others, for example. The master image generator 275 and the print job generator 285 can be implemented with the CPU 211, the system memory 212, and others, for example. The master image generator 275 may be implemented using, in combination, hardware such as an IC. The reading unit 277 can be implemented with the reading unit 201A, the reading unit 201B, the CPU 211, the system memory 212, the engine unit 260, and others, for example. The inspecting unit 281 can be implemented with the CPU 211, the system memory 212, the ASIC 216, and others, for example. The storage unit 283 can be implemented with the system memory 212, the HDD 218, and others, for example. The notification unit 287 can be implemented with the CPU 211, the system memory 212, the network I/F 230, and others, for example.

The reception unit 71 receives a print job from the PC 5. The reception unit 71 may receive a print job from a device other than the PC 5 and may receive a print job that is generated inside the DFE 10.

The print-management information generator 73 generates, based on a print job received by the reception unit 71, print management information for managing the print job and outputs the generated print management information to the printer 100.

The RIP unit 75 generates, based on the print job received by the reception unit 71, an original image to be a generation source of a print (to be a basis of printing) for each page and outputs the generated original image to the printer 100. In the embodiment, the printer 100 notifies, based on the print management information, the RIP unit 75 of the page of an original image of an output target. Then, the RIP unit 75 generates, based on the print job, the original image of the reported page and outputs the original image to the printer 100. For example, the RIP unit 75 performs a RIP process on the print job and generates a RIP image (a bitmap image) as an original image.

In the embodiment, a print job is structured including the data that is described by page description language (PDL) such as PostScript (registered trademark), the image data that is in a tagged-image file format (TIFF), and others, which however is not limited thereto. Furthermore, in the embodiment, it is assumed that the original image is a RIP image of CMYK and that each pixel of the respective RIP image data in cyan (C), magenta (M), yellow (Y), and black (K) is 1 bit and is of 600 dpi, which however is not limited thereto.

The reception unit 171 receives, from the print inspection apparatus 200, a print job for generating a position notification print. The position notification print is a print that reports the location of a print that is a target of position notification. In the embodiment, described is an example in which the print that is the target of position notification is any one of a print having a page defect, a print of the last page of a set including the print having a page defect, and a print of the last page of a job including the print having a page defect, which however is not limited thereto.

The print-management information generator 173 generates, based on a print job for generating a position notification print received by the reception unit 171, print management information for managing the print job and outputs the generated print management information to the processing unit 177.

The RIP unit 175 generates, based on a print job for generating a position notification print received by the reception unit 171, a position notification image to be a generation source of the position notification print and outputs the generated position notification image to the processing unit 177. In the embodiment, the printer 100 requests, based on the print management information, the RIP unit 175 to output a position notification image. Then, the RIP unit 175 generates, based on a print job for generating a position notification print, the position notification image and outputs the position notification image to the processing unit 177. For example, the RIP unit 175 performs a RIP process on the print job for generating a position notification print and generates a RIP image (a bitmap image) as a position notification image.

In the embodiment, a print job for generating a position notification print is also structured including the data described by page description language (PDL) such as PostScript, the image data in a TIFF format, and others, which however is not limited thereto. Furthermore, in the embodiment, it is also assumed that the position notification image is a RIP image of CMYK and that each pixel of the respective RIP image data in C, M, Y, and K is 1 bit and is of 600 dpi, which however is not limited thereto.

The processing unit 177 acquires the print management information from the DFE 10 or the print-management information generator 173 and holds the print management information (holds the print management information in the system memory 112, for example). The processing unit 177 selects the print management information about a print job of the highest priority out of the print management information being held, and updates the selected print management information. The processing unit 177 then outputs to the print unit 179 the updated print management information, and an image based on the updated print management information, and outputs the updated print management information and the image to the print inspection apparatus 200.

When the updated print management information is the print management information acquired from the DFE 10 (print management information other than the print management information that manages a print job for generating a position notification print), the processing unit 177 notifies the DFE 10 of the page of an original image for which the updated print management information indicates, acquires the original image of the page, and outputs the original image to the print unit 179.

Furthermore, when the updated print management information is the print management information acquired from the print-management information generator 173 (print management information that manages a print job for generating a position notification print), the processing unit 177 requests from the RIP unit 175 a position notification image for which the updated print management information indicates, acquires the position notification image, and outputs the position notification image to the print unit 179.

The print management information will be described. FIG. 7 is a table illustrating one example of the print management information in the embodiment. As illustrated in FIG. 7, the print management information in the embodiment includes items, remarks, and values. However, the remarks are the descriptions of the values that the items can assume, and may be omitted.

The items include, as illustrated in FIG. 7, generation source, generation time, page ID, print side, sheet ID (one example of sheet identification information), set ID, job ID, paper type, paper size, page, the number of pages, set, the number of sets, job priority, job status, position-notification print category, and position-notification target sheet ID, for example. However, the items are not limited thereto.

The generation source is a generation source (output source) of the print management information, and the value thereof indicates whether the generation source is DFE 10 or the inside (the printer 100). The value of the generation source is set by the print-management information generator of the generation source of the print management information.

The generation time is the time the print management information was generated, and the value thereof indicates such time. The value of the generation time is set by the print-management information generator of the generation source of the print management information.

The page ID is identification information identifying a print page in the whole prints printed in the printer 100. The value thereof is zero when the printer 100 is powered on, and the value of one is added for each output (print) of one page. The value of the page ID is set by the processing unit 177.

The print side is a printing side in printing an original image or a position notification image on a sheet, and the value thereof indicates single-sided, double-sided front, or double-sided rear. The single-sided represents the front side of the sheet in single-sided printing, the double-sided front represents the front side of the sheet in double-sided printing, and the double-sided rear represents the rear side of the sheet in double-sided printing. The value of the print side is set by the print-management information generator of the generation source of the print management information.

The sheet ID is identification information identifying a sheet of paper used in the printer 100. The value thereof is zero when the printer 100 is powered on, and the value of one is added for each output (print) of one sheet of paper. That is, the sheet ID assumes a role of an identifier identifying the sheet on which an original image is printed. The value of the sheet ID is set by the processing unit 177.

The set ID is identification information identifying the number of sets in the whole prints printed in the printer 100. The value thereof is zero when the printer 100 is powered on, and the value of one is added for each output (print) of one set. The value of the set ID is set by the processing unit 177.

The job ID is identification information identifying the number of jobs in the whole prints printed in the printer 100. The value thereof is zero when the printer 100 is powered on, and the value of one is added for each output (print) of one job. The value of the job ID is set by the processing unit 177.

The paper type is the type of paper used for printing, and the value thereof indicates such a type. The value of the paper type is set by the print-management information generator of the generation source of the print management information.

The paper size is the size of paper used for printing, and the value thereof indicates such a size. The value of the paper size is set by the print-management information generator of the generation source of the print management information.

The page indicates the page number in a set, and the value thereof indicates the page number in the set. The value of the page is set by the print-management information generator of the generation source of the print management information.

The number of pages is the number of pages in a set (total number of pages), and the value thereof indicates the number of pages in the set. The value of the number of pages is set by the print-management information generator of the generation source of the print management information.

The set indicates the set number in sets output in a print job (in the total number of sets output in the print job), and the value thereof indicates the set number in sets output in the print job. The value of the set is set by the print-management information generator of the generation source of the print management information.

The number of sets is the number of sets output in a print job (total number of print sets output in the print job), and the value thereof indicates the number of sets output in the print job. The value of the number of sets is set by the print-management information generator of the generation source of the print management information.

The job priority is the priority of a print job, and the value thereof indicates such priority. The order of priority is higher as the number in priority is smaller. In the embodiment, when the priority is 0 through 9, the print job is processed at the next break between pages available for outputting. When the priority is 10 through 19, the print job is processed at the next break between sets available for outputting. When the priority is 20 through 29, the print job is processed at the next break between print jobs available for outputting. When the priority is 30 through 99, the print job is processed at the next timing available for outputting. The job priority is set by the print-management information generator of the generation source of the print management information. In the embodiment, it is assumed that, when a print job is from the PC 5, that is, when the print-management information generator 73 sets the value of job priority, the value is 40. It is assumed that, when a print job is for generating a position notification print from the print inspection apparatus 200, that is, when the print-management information generator 173 sets the value of job priority, the value is 0, 10, or 20, which however is not limited thereto.

The job status is a processing status of a print job, and the value of unprocessed, in-print, print completion (without defects), print completion (with defects), or paper jam is indicated. The unprocessed represents that the print process is not yet processed. The in-print represents that the print process was finished and that the paper ejection is not yet completed. The print completion (without defects) represents that the print process was finished, that the paper ejection was completed, and that there are no defects in the ejected prints. The print completion (with defects) represents that the print process was finished, that the paper ejection was completed, and that there are defects in the ejected prints. The paper jam represents that the print process was finished and that a paper jam has occurred. The job status is set by the print-management information generator of the generation source of the print management information and is updated by the processing unit 177.

The position-notification print category is the category of position notification printing for generating a position notification print, and the value of off, per page, per set, or per job is indicated. The off represents that the position notification printing is not performed. The per page represents that, when a print of position notification target was generated, the position notification printing is performed on a page by page basis. The per set represents that, when a print of position notification target was generated, the position notification printing is performed on a set by set basis. The per job represents that, when a print of position notification target was generated, the position notification printing is performed on a job by job basis. The position-notification print category is set, based on the setting of the position-notification print category input from the operation panel 101 or the operation panel 203 by the user, by the print-management information generator of the generation source of the print management information.

The position-notification target sheet ID is a sheet ID of the print that is the target of position notification, and the value thereof indicates such an ID. The value of the position-notification target sheet ID is set by the print-management information generator 173.

Referring back to FIG. 6, when an original image and the print management information are output from the processing unit 177, the print unit 179 conveys a sheet in accordance with the print management information, executes print processing including image formation processing, and prints the original image on the sheet to generates a print.

Specifically, in a case of single-sided printing, when a set of an original image and the print management information is output from the processing unit 177, the print unit 179 conveys a sheet in accordance with the print management information and prints the original image on the print side (front side) of the sheet to generate a print.

Furthermore, in a case of double-sided printing, when two sets of an original image and the print management information are output from the processing unit 177, the print unit 179 conveys a sheet in accordance with two pieces of the print management information and prints each of the two original images on the appropriate print side (front side, rear side) of the sheet to generate a print.

That is, the print unit 179 prints original images for N (N≥1) pages on M (M≥1) sheets of paper and generates M prints. In the case of the print management information illustrated in FIG. 7, the value of N is a value equal to or smaller than the page ID. In more detail, the value of N is assumed to be the page ID of the print management information immediately before the first print management information for which the value of generation source is the inside, which however is not limited thereto. Furthermore, the value of M is N/2≤M≤N. Specifically, when all of the printing performed by the printer 100 is single-sided printing until the value of the page ID is N, the value of M is M=N. When all of the printing performed by the printer 100 is double-sided printing until the value of the page ID is N, and when the printing is performed on both sides of all sheets, the value of M is M=N/2.

When a position notification image and the print management information are output from the processing unit 177, the print unit 179 conveys a sheet in accordance with the print management information, executes the print processing including image formation processing, and prints the position notification image on the sheet to generates a position notification print.

The image acquiring unit 271 acquires, each time a print is generated by the printer 100, an original image of the generation source of the print from the printer 100. Consequently, the image acquiring unit 271 acquires the original images for N pages from the printer 100 (the processing unit 177).

Specifically, when a print or a position notification print is generated by the printer 100, the image acquiring unit 271 acquires an original image of the generation source of the print or a position notification image of the generation source of the position notification print (in the embodiment, both are RIP images in C, M, Y, and K) from the printer 100 (the processing unit 177).

The image acquiring unit 271 acquires one image of the generation source of a print or a position notification print from the printer 100 when the generated print or the position notification print is single-sided printing. When the generated print is double-sided printing, the image acquiring unit 271 acquires two original images of the generation source of the print from the printer 100.

The print-management information acquiring unit 273 acquires, each time a print is generated by the printer 100, print management information about an original image of the generation source of the print from the printer 100. Consequently, the print-management information acquiring unit 273 acquires the print management information about the original image for each original image from the printer 100 (the processing unit 177).

Specifically, when a print or a position notification print is generated by the printer 100, the print-management information acquiring unit 273 acquires the print management information about an original image of the generation source of the print from the printer 100 (the processing unit 177), or a position notification image of the generation source of the position notification image, and outputs the image to the master image generator 275, the reading unit 277, and the print job generator 285.

The print-management information acquiring unit 273 acquires the print management information about one image of the generation source of a print or a position notification print from the printer 100 when the generated print or the position notification print is single-sided printing. When the generated print is double-sided printing, the print-management information acquiring unit 273 acquires the respective pieces of print management information about two original images of the generation source of the print from the printer 100.

Furthermore, when the information necessary for post-processing devices (in the embodiment, the stacker 300) is included in the acquired print management information, the print-management information acquiring unit 273 may output an appropriate piece of information to the post-processing devices, and may output to the master image generator 275, the reading unit 277, and the print job generator 285 the print management information from which the appropriate piece of information is removed.

The master image generator 275 generates a master image based on the image acquired by the image acquiring unit 271. Specifically, the master image generator 275 performs various image processing such as a multi-value conversion process, a dot-gain correction process, a smoothing process, a resolution conversion process, and a color conversion process on the respective RIP images of C, M, Y, and K acquired by the image acquiring unit 271, and generates a master image. The master image generator 275 then associates the generated master image with the print management information output from the print-management information acquiring unit 273 and outputs the associated information to the inspecting unit 281.

In the embodiment, it is assumed that the master image is image data of RGB and that each pixel of the respective image data in R, G, and B is 8 bit and is of 200 dpi, which however is not limited thereto.

The reading unit 277 reads the print generated by the print unit 179 and generates a read image. Specifically, in accordance with the print management information output from the print-management information acquiring unit 273, the reading unit 277 electronically reads the print side indicated by the print management information from the print, and generates a read image. The reading unit 277 then associates the generated read image with the print management information output from the print-management information acquiring unit 273 and outputs the associated information to the inspecting unit 281.

When the print that is a target of reading is single-sided printing, the reading unit 277, in accordance with a single piece of print management information output from the print-management information acquiring unit 273, electronically reads the print side (front side) that the single piece of print management information indicates, from the print, and generates a read image. The reading unit 277 then associates the generated read image with the single piece of print management information and outputs the associated information to the inspecting unit 281.

When the print that is a target of reading is double-sided printing, the reading unit 277, in accordance with two pieces of print management information output from the print-management information acquiring unit 273, electronically reads the respective print sides (front side and rear side) that the two pieces of print management information indicate, from the print, and generates two read images. The reading unit 277 then associates each of the generated two read images with the corresponding print management information out of the two pieces of print management information, and outputs the associated information to the inspecting unit 281.

That is, for each print, the reading unit 277 reads one or more print sides of the print to generate one or more read images.

The reading unit 277 further reads a position notification print generated by the print unit 179 and generates a read image. Specifically, in accordance with the print management information output from the print-management information acquiring unit 273, the reading unit 277 electronically reads the print side indicated by the print management information from the position notification print, and generates a read image. The reading unit 277 then associates the generated read image with the print management information output from the print-management information acquiring unit 273 and outputs the associated information to the inspecting unit 281.

In the embodiment, it is assumed that the read image is image data of RGB and that each pixel of the respective image data in R, G, and B is 8 bit and is of 200 dpi, which however is not limited thereto.

The print that was read by the reading unit 277 is ejected to the stacker 300. Consequently, in the tray 301 of the stacker 300, the prints and the position notification prints generated by the printer 100 are stacked in order of generation.

The inspecting unit 281 compares a master image output from the master image generator 275 with a read image output from the reading unit 277, and examines whether any defects has occurred on the print or the position notification print that is of the generation source of the read image.

When the print or the position notification print that is a target of inspection is single-sided printing, the inspecting unit 281 compares a single read image output from the reading unit 277 with a single master image output from the master image generator 275, and examines whether any defects has occurred on the print side (front side) of the print or the position notification print that is the generation source of the single read image.

When the print or the position notification print that is a target of inspection is double-sided printing, the inspecting unit 281 compares each of two read images output from the reading unit 277 with a corresponding master image out of two master images output from the master image generator 275, and examines whether any defects has occurred on the respective print sides (front side and rear side) of the print or the position notification print that is of the generation source of the two read images.

That is, the inspecting unit 281 examines, for each print, based on one or more read images and one or more original images that correspond to the one or more read images, whether a defect has occurred on at least one of one or more print sides of the print.

Specifically, the inspecting unit 281 holds the master images and the print management information, which are output from the master image generator 275, in association with each other, and when a read image and the print management information are output from the reading unit 277, the inspecting unit 281 acquires, out of the held master images, a master image that is associated with the print management information corresponding to the print management information associated with the read image.

The inspecting unit 281 then performs alignment between the read image output from the reading unit 277 and the acquired master image, and compares the read image with the master image after the alignment in units of pixels. The inspecting unit 281 calculates for each pixel a difference value in pixel value of eight bits for each color of RGB, and generates a difference image having difference values of pixel values of each pixel.

Furthermore, the inspecting unit 281 performs determination using a difference threshold of dot defect on the generated difference image, and on the result of determination using the difference threshold of dot defect, performs determination using an area threshold of dot defect.

The difference threshold of dot defect is a threshold for each pixel in a difference image, and the pixels exceeding the threshold are determined to be abnormal pixels of dot defect. When there are a plurality of abnormal pixels of dot defect within a certain range, the plurality of abnormal pixels are regarded as a single group of abnormal pixels of dot defect. The area threshold of dot defect is a threshold for the number of abnormal pixels of dot defect included in a single group of abnormal pixels of dot defect, and when the number of abnormal pixels of dot defect exceeds the threshold, the group of abnormal pixels is determined to be a dot defect.

The inspecting unit 281 further performs determination using a difference threshold of line defect on the generated difference image, and on the result of determination using the difference threshold of line defect, performs determination using an area threshold of line defect.

The difference threshold of line defect is a threshold for each pixel in a difference image, and the pixels exceeding the threshold are determined to be abnormal pixels of line defect. When there are a plurality of abnormal pixels of line defect within a certain range, the plurality of abnormal pixels are regarded as a single group of abnormal pixels of line defect. The area threshold of line defect is a threshold for the number of abnormal pixels of line defect included in a single group of abnormal pixels of line defect, and when the number of abnormal pixels of line defect exceeds the threshold, the group of abnormal pixels is determined to be a line defect.

The inspecting unit 281 further performs determination using a difference threshold of surface defect on the generated difference image, and on the result of determination using the difference threshold of surface defect, performs determination using an area threshold of surface defect.

The difference threshold of surface defect is a threshold for each pixel in a difference image, and the pixels exceeding the threshold are determined to be abnormal pixels of surface defect. When there are a plurality of abnormal pixels of surface defect within a certain range, the plurality of abnormal pixels are regarded as a single group of abnormal pixels of surface defect. The area threshold of surface defect is a threshold for the number of abnormal pixels of surface defect included in a single group of abnormal pixels of surface defect, and when the number of abnormal pixels of surface defect exceeds the threshold, the group of abnormal pixels is determined to be a surface defect.

The inspecting unit 281 further calculates, for each defect, the absolute value of a difference between the pixel value of each abnormal pixel included in the defect and the difference threshold of the defect, multiplies a total value of the calculated absolute values of the differences by a defect determination coefficient of the defect, and calculates a defect determination value. The defect determination coefficient is a coefficient used for the calculation of the defect determination value.

The inspecting unit 281 then performs page defect determination in which a total value of the defect determination value of each defect is compared with a page-defect determination threshold. As a result, when the total value is equal to or greater than the page-defect determination threshold, the inspecting unit 281 determines the occurrence of a page defect on the print side of the print or the position notification print that are the generation source of the read image used for the generation of the difference image, that is, the print page indicated by the page ID of the print management information associated with the read image and the master image used for the generation of the difference image. The page-defect determination threshold is a threshold for the total value of the defect determination values, and the occurrence of a page defect is determined on the print page (print side of the print) exceeding the threshold.

The various thresholds (the difference threshold of dot defect, the area threshold of dot defect, the difference threshold of line defect, the area threshold of line defect, the difference threshold of surface defect, the area threshold of surface defect, the defect determination coefficient of dot defect, the defect determination coefficient of line defect, the defect determination coefficient of surface defect, the page defect determination threshold, and others) used in the inspection of the inspecting unit 281 can be set by the user from the operation panel 203 and others.

Although the description is omitted in the embodiment, there are also a difference threshold and an area threshold of the respective defects for defect candidate determination, in addition to the ones for the defect determination. If the above-described inspection is performed using the difference threshold and the area threshold for the defect candidate determination of the respective defects, the defect candidates of the dot defect, the line defect, and the surface defect can also be determined.

When the inspection is finished, the inspecting unit 281 generates inspection result information indicating the result of inspection and stores the inspection result information in the storage unit 283 in association with the read image and master image used for the generation of the difference image used in the inspection.

FIG. 8 is a table illustrating one example of the inspection result information stored in the storage unit 283 in the embodiment. In the example illustrated in FIG. 8, the inspection result information includes page ID, sheet ID, print side, positional displacement in X direction, positional displacement in Y direction, the number of occurred defects, the number of defect candidates, and page-defect determination result. In the embodiment, the inspection result information is assumed to be stored on a job by job basis, which however is not limited thereto.

The page ID, the sheet ID, and the print side has been extracted from the print management information. The positional displacement in X direction indicates the amount of positional displacement of the read image in the X direction with respect to the master image, and the positional displacement in Y direction indicates the amount of positional displacement of the read image in the Y direction with respect to the master image. The positional displacement in X direction and the positional displacement in Y direction are the result of alignment between the read image and the master image. The number of occurred defects represents the number of defects (the total number of dot defects, line defects, and surface defects) that have occurred on a print page (the print side of a print identified by the sheet ID and the print side) indicated by the page ID. The number of defect candidates represents the number of defect candidates (the total number of dot defect candidates, line defect candidates, and surface defect candidates) that have occurred on a print page (the print side of a print identified by the sheet ID and the print side) indicated by the page ID. The page-defect determination result indicates whether there is a page defect (a defective print) on a print page indicated by the page ID (the print side of a print identified by the sheet ID and the print side) or there is no page defect (a good print).

FIG. 9 is a table illustrating one example of defect information stored in the storage unit 283 as a part of the inspection result information in the embodiment. The defect information is the detail information on defects and defect candidates that have occurred on a print page (the print side of a print identified by the sheet ID and the print side) indicated by the page ID. In the example illustrated in FIG. 9, the defect information includes defect ID, defect category, defect determination result, upper-left X coordinate, upper-left Y coordinate, X size, Y size, area, and defect determination value. In the embodiment, it is assumed that the defect information is stored on a page ID by page ID basis, which however is not limited thereto.

The defect ID is an identifier of defect. The defect category is the category of defect. The defect determination result indicates whether the defect determination result is a defect or a defect candidate. The upper-left X coordinate indicates the X coordinate of the upper left of a defect. The upper-left Y coordinate indicates the Y coordinate of the upper left of the defect. The X size indicates the length of the defect in the X axis direction. The Y size indicates the length of the defect in the Y axis direction. The upper left X coordinate, the upper left Y coordinate, the X size, and the Y size are one example of defect position information, and indicate the location of a defect indicated by the defect ID on the read image generated by reading a print page (the print side of a print identified by the sheet ID and the print side) indicated by the page ID.

Referring back to FIG. 6, when the value of the generation source in the print management information that is output from the print-management information acquiring unit 273 is DFE 10 and the value of the position-notification print category is per page, the print job generator 285 acquires, from the storage unit 283, the inspection result information for which the value of the page ID corresponds to the value of the page ID and a read image that is associated with the inspection result information. When the page-defect determination result of the acquired inspection result information is with a page defect, the print job generator 285 generates a print job for generating a position notification print on a page by page basis.

In the case of a position notification print on a page by page basis, the print that is a target of position notification by the position notification print is a print that has a page defect, that is, the print indicated by the sheet ID of the acquired inspection result information.

The print job generator 285 generates a position-notification image generation image to generate a position notification print that is the generation source of a position notification print, and includes the position-notification image generation image into a print job for generating a position notification print on a page by page basis.

The position-notification image generation image includes an image based on the read image generated by reading the print side of a print on which a page defect has occurred, that is, an image based on the read image acquired from the storage unit 283. In the embodiment, the print job generator 285 generates, based on the defect information included in the acquired inspection result information and based on the acquired read image, an image in which the location of a defect is indicated on the read image as an image based on the read image.

Figure 10:
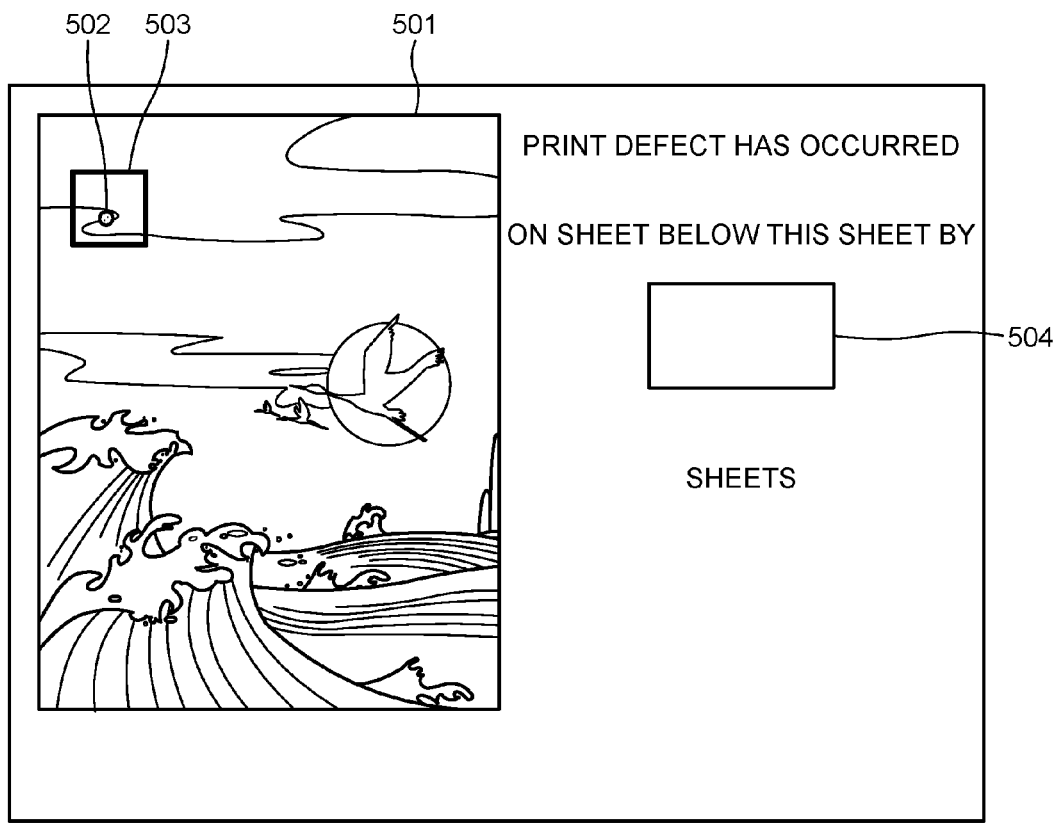
FIG. 10 is a view illustrating one example of a position-notification image generation image that is included in a print job for generating a position notification print on a page by page basis in the embodiment.

FIG. 10 is a view illustrating one example of a position-notification image generation image that is included in a print job for generating a position notification print on a page by page basis in the embodiment. As illustrated in FIG. 10, in a position-notification image generation image, a read image (in detail, a reduction image of the read image) 501 of the print side of a print that is a target of position notification is included, and in the read image 501, a defect 502 is surrounded by a frame 503. The frame 503 is a rectangle based on the upper-left X coordinate, the upper-left Y coordinate, the X size, and the Y size of the defect information included in the inspection result information, and is generated by the print job generator 285 on the read image 501.

The position-notification image generation image further includes a display frame 504. The display frame 504 displays the number of sheets by which the print that is the target of position notification is stacked under a position notification print, when the position notification print that is generated based on the position-notification image generation image is stacked in the tray 301 of the stacker 300. The entry of a numerical value in the display frame 504, however, is made by the printer 100.

The print job generator 285 further includes the sheet ID of the acquired inspection result information in a print job for generating a position notification print on a page by page basis. This is because the printer 100 needs the sheet ID to identify the numerical value to be entered in the display frame 504.

When the value of the generation source in the print management information that is output from the print-management information acquiring unit 273 is DFE 10, when the value of the position-notification print category is per set, and when the value of the page corresponds to the value of the number of pages, the print job generator 285 acquires the inspection result information about all page IDs included in the set from the storage unit 283, using the values of the page ID and the number of pages.

Specifically, the value of the page ID in the print management information that is output from the print-management information acquiring unit 273 in this case is the value of the page ID of the last page of the set. Consequently, the print job generator 285 calculates the value of the page ID of the first page of the set using the value of the page ID and the value of the number of pages, and acquires the inspection result information about all page IDs that correspond to the values of the respective page IDs from the first page to the last page from the storage unit 283. The value of the page ID of the first page of the set is obtained by (the value of the page ID of the last page of the set)−(the value of the number of pages)+1.

Then, if the inspection result information in which the page-defect determination result indicates occurrence of a page defect is included in the acquired inspection result information, the print job generator 285 generates a print job for generating a position notification print on a set by set basis.

In the case of a position notification print on a set by set basis, the print that is a target of position notification by the position notification print is the print of the last page in the set that includes the print that has a page defect, that is, the print indicated by the sheet ID of the acquired inspection result information for which the value of the page ID is the largest out of the acquired inspection result information.

The print job generator 285 generates a position-notification image generation image to generate a position notification image that is the generation source of a position notification print, and includes the position-notification image generation image in a print job for generating a position notification print on a set by set basis.

The position-notification image generation image includes an image that indicates the ordinal number, in the set, of the print having the print side on which the page defect has occurred, that is, of the print indicated by the sheet ID of the inspection result information in which the page-defect determination result indicates occurrence of a page defect, is present.

Figure 11:
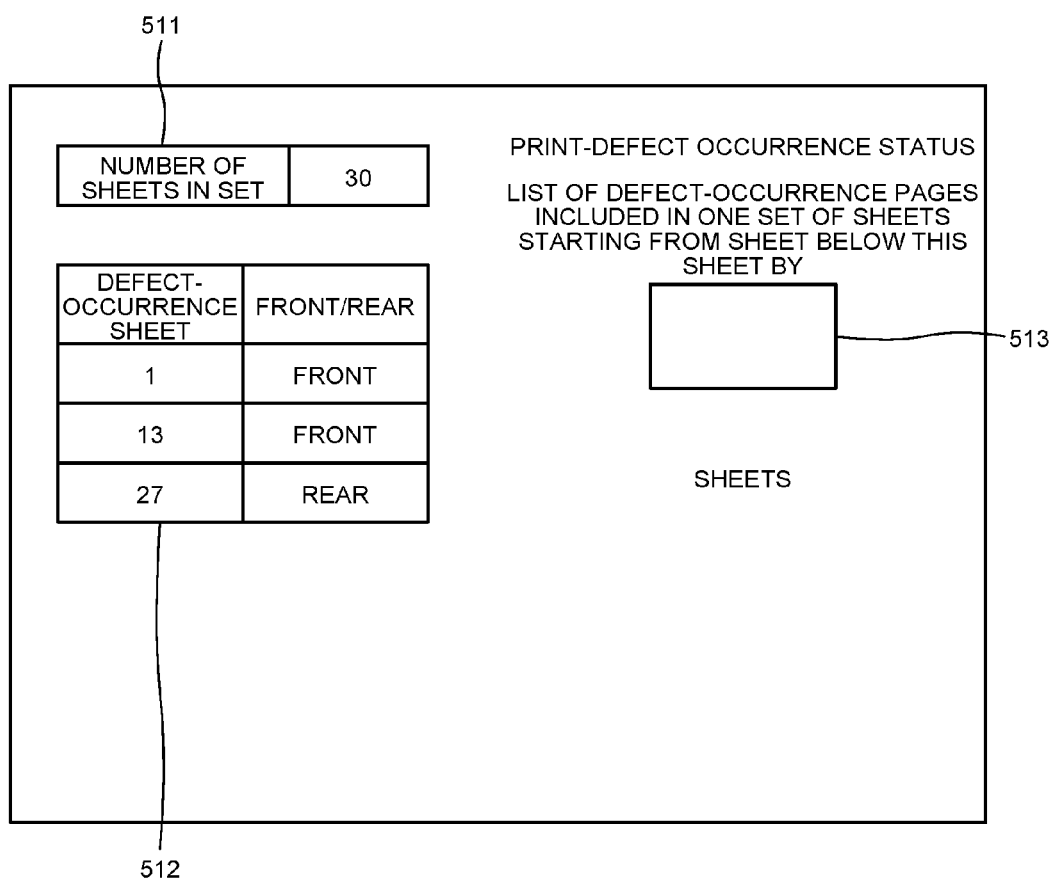
FIG. 11 is a view illustrating one example of a position-notification image generation image that is included in a print job for generating a position notification print on a set by set basis in the embodiment.

FIG. 11 is a view illustrating one example of a position-notification image generation image that is included in a print job for generating a position notification print on a set by set basis in the embodiment. As illustrated in FIG. 11, the position-notification image generation image includes the number of sheets in the set 511 that indicates the number of prints of a whole of the set. The value of the number of sheets in the set 511 is obtained by (the value of the sheet ID in the inspection result information about the first page of the set)−(the value of the sheet ID in the inspection result information about the last page of the set)+1.

The position-notification image generation image further includes a list image 512 that indicates the numbers, from the first in the set, of the prints on which respective page defects have occurred, and the print sides (front side or rear side) on which the respective page defects have occurred. The value of defect-occurrence sheet that indicates the ordinal number, from the first of the set, of the print on which a page defect has occurred is obtained by (the value of the sheet ID of the inspection result information in which the page-defect determination result indicates occurrence of a page defect)−(the value of the sheet ID of the inspection result information about the first page of the set)+1. The value of front/rear that indicates the print side of the print on which the page defect has occurred is the value of the print side in the inspection result information in which the page-defect determination result indicates occurrence of a page defect.

The position-notification image generation image further includes a display frame 513. The display frame 513 displays the number of sheets by which the print that is the target of position notification is stacked below a position notification print, when the position notification print that is generated based on the position-notification image generation image is stacked in the tray 301 of the stacker 300. The entry of a numerical value in the display frame 513, however, is made by the printer 100.

The print job generator 285 further includes the sheet ID of the acquired inspection result information about the last page of the set into a print job for generating a position notification print on a set by set basis. This is because the printer 100 needs the sheet ID to identify the numerical value to be entered in the display frame 513.

When the value of the generation source in the print management information that is output from the print-management information acquiring unit 273 is DFE 10, when the value of the position-notification print category is per job, when the value of the page corresponds to the value of the number of pages, and when the value of the set corresponds to the value of the number of sets, the print job generator 285 acquires the inspection result information about all page IDs included in the job from the storage unit 283, using the values of the page ID, the number of pages, and the number of sets.

Specifically, the value of the page ID in the print management information that is output from the print-management information acquiring unit 273 in this case is the value of the page ID of the last page of the job. Consequently, the print job generator 285 calculates the value of the page ID of the first page of the job using the values of the page ID, the number of pages, and the number of sets, and acquires the inspection result information about the page IDs that correspond to the values of the respective page IDs from the first page to the last page, from the storage unit 283. The value of the page ID of the first page of the job is obtained by (the value of the page ID of the last page of the job)−((the value of the number of pages)×(the value of the number of sets))+1.

When the inspection result information in which the page-defect determination result indicates occurrence of a page defect is included in the acquired inspection result information, the print job generator 285 generates a print job for generating a position notification print on a job by job basis.

In the case of a position notification print on a job by job basis, the print that is a target of position notification by the position notification print is the print of the last page in the job that includes the print that has a page defect, that is, the print indicated by the sheet ID of the acquired inspection result information for which the value of the page ID is the largest out of the acquired inspection result information.

The print job generator 285 generates a position-notification image generation image to generate the position notification image that is the generation source of a position notification print, and includes the position-notification image generation image in a print job for generating a position notification print on a job by job basis.

The position-notification image generation image includes an image that indicates the ordinal number, in the job, of the print having the print side on which the page defect has occurred, that is, the print indicated by the sheet ID of the inspection result information in which the page-defect determination result indicates occurrence of a page defect.

Figure 12:
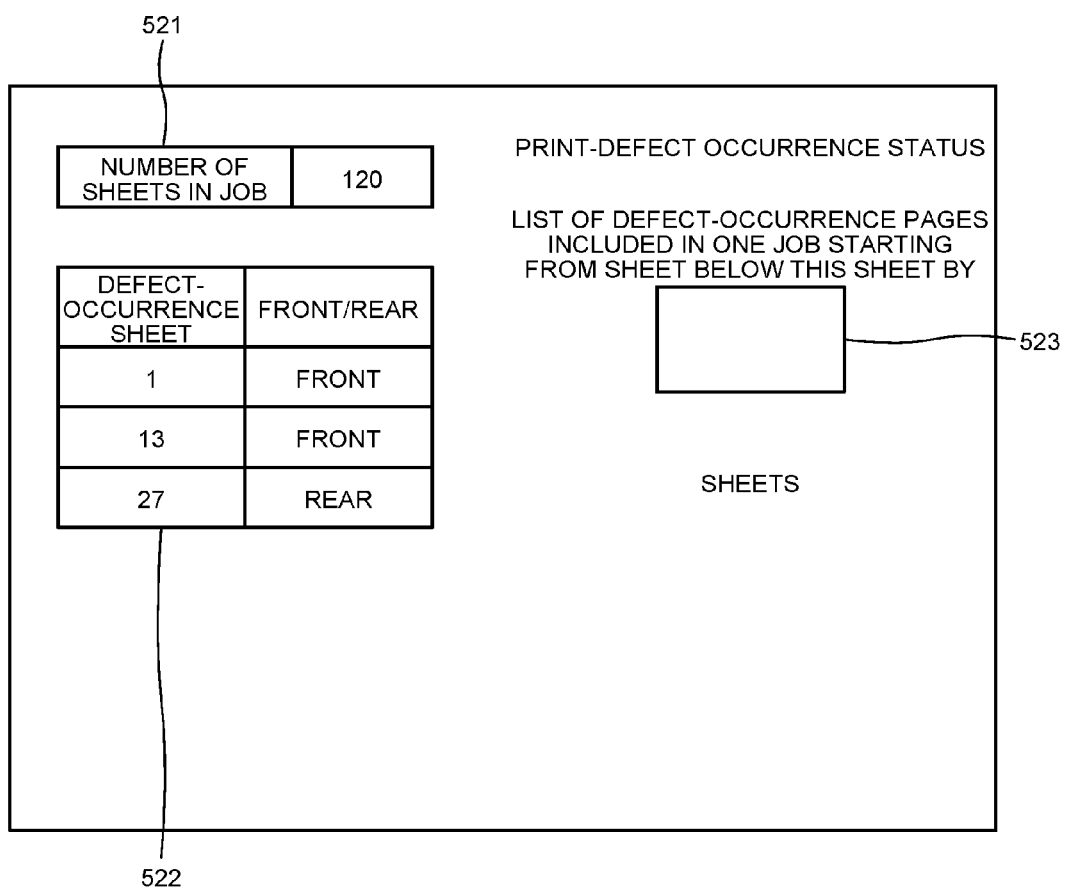
FIG. 12 is a view illustrating one example of a position-notification image generation image that is included in a print job for generating a position notification print on a job by job basis in the embodiment.

FIG. 12 is a view illustrating one example of a position-notification image generation image that is included in a print job for generating a position notification print on a job by job basis in the embodiment. As illustrated in FIG. 12, the position-notification image generation image includes the number of sheets in the job 521 that indicates the number of prints of a whole of the job. The value of the number of sheets in the job 521 is obtained by (the value of the sheet ID in the inspection result information about the first page of the job)−(the value of the sheet ID in the inspection result information about the last page of the job)+1.

The position-notification image generation image further includes a list image 522 that indicates the ordinal numbers, from the first in the job, of the prints on which respective page defects have occurred, and the print sides (front side or rear side) on which the respective page defects have occurred. The value of defect-occurrence sheet that indicates the ordinal number, from the first in the job, of the print on which a page defect has occurred is obtained by (the value of the sheet ID of the inspection result information in which the page-defect determination result indicates occurrence of a page defect)−(the value of the sheet ID of the inspection result information about the first page of the job)+1. The value of front/rear that indicates the print side of the print on which the page defect has occurred is the value of the print side in the inspection result information in which the page-defect determination result indicates occurrence of a page defect.

The position-notification image generation image further includes a display frame 523. The display frame 523 displays the number of sheets by which the print that is the target of position notification is stacked below a position notification print, when the position notification print that is generated based on the position-notification image generation image is stacked in the tray 301 of the stacker 300. The entry of a numerical value in the display frame 523, however, is made by the printer 100.

The print job generator 285 further includes the sheet ID of the acquired inspection result information about the last page of the job into a print job for generating a position notification print on a job by job basis. This is because the printer 100 needs the sheet ID to identify the numerical value to be entered in the display frame 523.

The notification unit 287 notifies the printer 100 of the print job for generating a position notification print generated by the print job generator 285.

As in the foregoing, in a print job for generating a position notification print, a position-notification image generation image is included. Consequently, the notification unit 287 notifies the printer 100 of the position-notification image generation image.

As in the foregoing, in a print job for generating a position notification print, the sheet ID of a print to be the target of position notification by the position notification print is also included. Thus, the notification unit 287 notifies the printer 100 of the sheet ID of the sheet on which an original image of a certain page is printed, out of the original images for one or more pages including an original image formed on the print side on which a defect has occurred.

In the case of a print job for generating a position notification print on a page by page basis, the original images for one or more pages are the original image itself formed on the print side on which a defect has occurred, and the original image of a certain page also is the original image itself formed on the print side on which the defect has occurred. That is, the notification unit 287 notifies the printer 100 of the sheet ID of the inspection result information in which the page defect determination result indicates occurrence of a page defect.

In the case of a print job for generating a position notification print on a set by set basis, the original images for one or more pages are one or more original images that constitute a set including the original image formed on the print side on which a defect has occurred, and the original image of a certain page is the original image formed on the last page of the set. That is, the notification unit 287 notifies the printer 100 of the sheet ID of the inspection result information about the last page of the set.

In the case of a print job for generating a position notification print on a job by job basis, the original images for one or more pages are one or more original images that constitute a job including the original image formed on the print side on which a defect has occurred, and the original image of a certain page is the original image formed on the last page of the job. That is, the notification unit 287 notifies the printer 100 of the sheet ID of the inspection result information about the last page of the job.

The reception unit 171, the print-management information generator 173, the processing unit 177, the RIP unit 175, and the print unit 179 will be described again.

The reception unit 171 receives, from the print inspection apparatus 200, a print job for generating a position notification print on a page by page basis, a print job for generating a position notification print on a set by set basis, or a print job for generating a position notification print on a job by job basis.

The print-management information generator 173 generates, based on the print job for generating a position notification print received by the reception unit 171, print management information for managing the print job and outputs the generated print management information to the processing unit 177.

At this time, if the print job for generating a position notification print received by the reception unit 171 is a print job for generating a position notification print on a page by page basis, then the print-management information generator 173 sets the value of the job priority to zero and sets the value of the position-notification print category for each page. Consequently, at a subsequent break between pages, the print job for generating a position notification print received by the reception unit 171 can be squeezed in, and the printing based on the print job can be performed. The reason why the print job for generating a position notification print received by the reception unit 171 can be squeezed in at a subsequent break between pages will be described later.

Furthermore, if the print job for generating a position notification print received by the reception unit 171 is a print job for generating a position notification print on a set by set basis, then the print-management information generator 173 sets the value of the job priority to 10 and sets the value of the position-notification print category for each set. Consequently, at a subsequent break between sets, the print job for generating a position notification print received by the reception unit 171 can be squeezed in, and the printing based on the print job can be performed. The reason why the print job for generating a position notification print received by the reception unit 171 can be squeezed in at a subsequent break between sets will be described later.

If the print job for generating a position notification print received by the reception unit 171 is a print job for generating a position notification print on a job by job basis, then the print-management information generator 173 sets the value of the job priority to 20 and sets the value of the position-notification print category for each job. Consequently, at a subsequent break between jobs, the print job for generating a position notification print received by the reception unit 171 can be squeezed in, and the printing based on the print job can be performed. The reason why the print job for generating a position notification print received by the reception unit 171 can be squeezed in at a subsequent break between jobs will be described later.

The print-management information generator 173 sets the value of the position-notification target sheet ID to the value of the sheet ID included in the print job for generating a position notification print received by the reception unit 171.

The processing unit 177 acquires and holds the print management information from the print-management information generator 173. When the print management information is selected out of the held print management information, the processing unit 177 sets the respective values of the page ID, the sheet ID, the set ID, and the job ID of the print management information and updates the value of the job status to in-print. The processing unit 177 then outputs the updated print management information to the RIP unit 175 so as to acquire a position notification image that the updated print management information indicates, for example.

The RIP unit 175 generates, based on the print job for generating a position notification print received by the reception unit 171, and the print management information output from the processing unit 177, a position notification image to be the generation source of a position notification print and outputs the generated position notification image to the processing unit 177.

Specifically, when the position notification print that is generated based on the position notification image generated is stacked in the tray 301 of the stacker 300, the RIP unit 175 identifies, from a difference between the value of the sheet ID on the print management information output from the processing unit 177 and the value of the position-notification target sheet ID, the number of sheets by which the print that is the target of position notification is stacked below the position notification print.

Then, the RIP unit 175 performs a RIP process so that, within the display frame in the position-notification image generation image included in the print job for generating a position notification print received by the reception unit 171, an image of the identified numerical value (a numerical value indicating the number of prints under) is combined, and generates the position notification image.

That is, if the print job for generating a position notification print received by the reception unit 171 is a print job for generating a position notification print on a page by page basis, then the RIP unit 175 combines the position-notification image generation image with the image indicating the number of sheets by which the print having the print side on which a defect has occurred is below the position notification print, and generates a position notification image.

If the print job for generating a position notification print received by the reception unit 171 is a print job for generating a position notification print on a set by set basis, then the RIP unit 175 combines the position-notification image generation image with the image indicating the number of sheets by which the print on which the original image of the last page of the set is formed is below the position notification print, and generates a position notification image.

If the print job for generating a position notification print received by the reception unit 171 is a print job for generating a position notification print on a job by job basis, then the RIP unit 175 combines the position-notification image generation image with the image indicating the number of sheets by which the print on which the original image of the last page of the job is formed is below the position notification print, and generates a position notification image.

Figure 13:
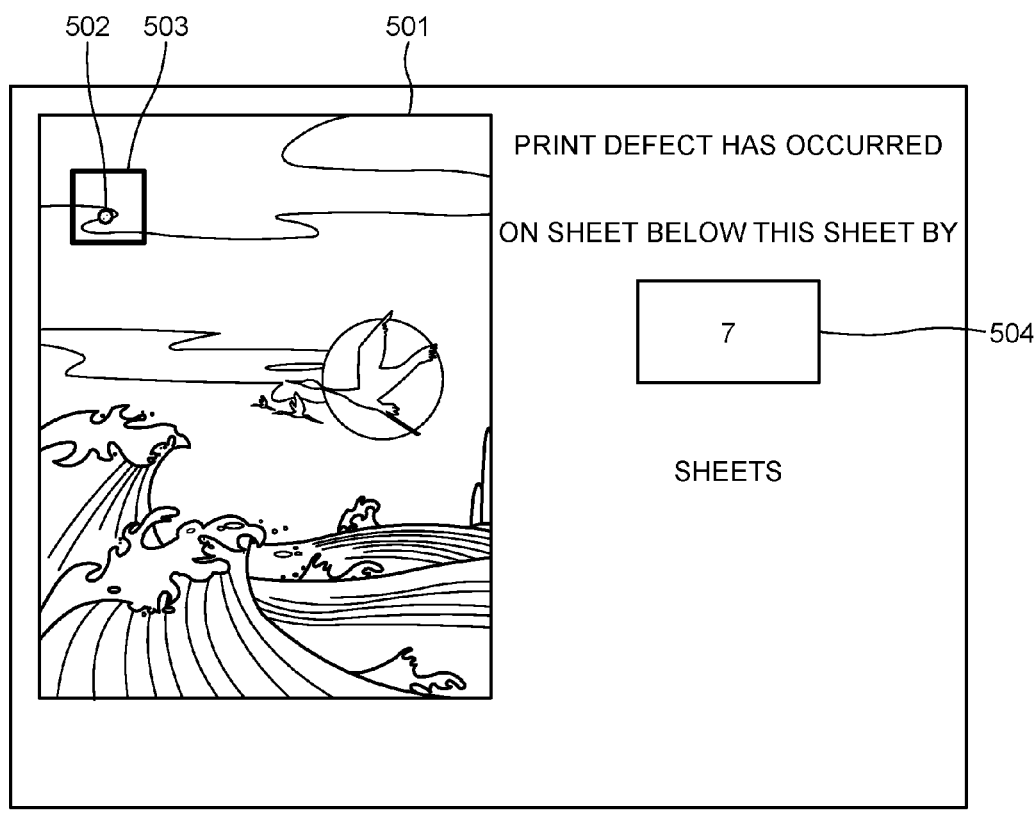
FIG. 13 is a view illustrating one example of a position notification image generated based on a print job for generating a position notification print on a page by page basis in the embodiment.

FIG. 13 is a view illustrating one example of a position notification image generated based on a print job for generating a position notification print on a page by page basis in the embodiment. FIG. 13 illustrates that, in the display frame 504 in the position-notification image generation image illustrated in FIG. 10, the print that is the target of position notification is stacked below the position notification print generated based on the position notification image by seven sheets.

That is, the RIP unit 175 generates, based on the sheet ID reported from the print inspection apparatus 200 (the position-notification target sheet ID of the print management information about a print job for generating a position notification print) and the sheet ID of a sheet on which the position notification image is printed (the sheet ID of the print management information about the print job for generating a position notification print), an image that indicates the number of sheets by which the print on which the original image of a certain page is formed is below a position notification print, as a position notification image. Thus, the position notification image indicates the positional relation with the print on which the original image of a certain page is formed.

The processing unit 177 then outputs to the print unit 179 the updated print management information, and the position notification image that is output from the RIP unit 175. The print unit 179 conveys a sheet in accordance with the print management information, and prints the position notification image on the sheet to generate a position notification print. That is, the print unit 179 prints, based on the sheet ID reported from the print inspection apparatus 200 (the position-notification target sheet ID of the print management information about a print job for generating a position notification print) and the sheet ID of a sheet on which the position notification image is printed (the sheet ID of the print management information about the print job for generating a position notification print), the position notification image on the sheet and generates a position notification print.

Subsequently, the generated position notification print is stacked in the tray 301 of the stacker 300 via the print inspection apparatus 200.

Figure 14:
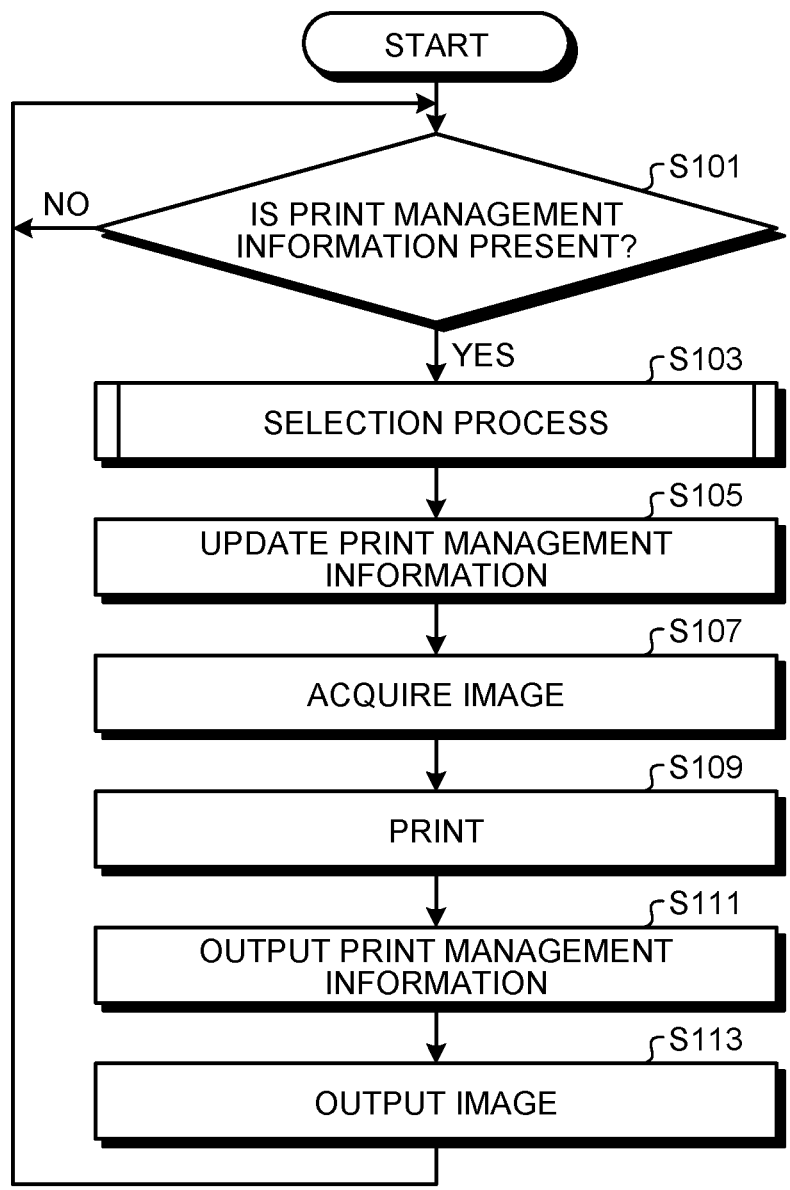
FIG. 14 is a flowchart illustrating one example of procedures of a print process performed in the printer in the embodiment.

FIG. 14 is a flowchart illustrating one example of procedures of a print process performed in the printer 100 in the embodiment.

First, the processing unit 177 checks for the presence of print management information that is being held (Step S101). If the print management information that is being held is not present (No at Step S101), then the process returns to Step S101.

On the other hand, if the print management information that is being held is present (Yes at Step S101), the processing unit 177 performs a selection process in which the print management information about the print job of a highest priority is selected out of the print management information being held (Step S103). The detail of the selection process will be described later.

Then, the processing unit 177 updates the selected print management information (Step S105). For example, in the case of the print management information illustrated in FIG. 7, the processing unit 177 sets the respective values of the page ID, the sheet ID, the set ID, and the job ID, and updates the value of the job status to in-print.

The processing unit 177 then acquires an image based on the updated print management information and outputs the updated print management information and the image to the print unit 179 (Step S107). For example, in the case of example illustrated in FIG. 7, if the value of the generation source is DFE 10, then the processing unit 177 notifies the DFE 10 of the value of the page and acquires an original image of the page. If the value of the generation source is the inside, then the processing unit 177 notifies the RIP unit 175 of the value of the page and acquires a position notification image of the page.

Then, the print unit 179 conveys a sheet in accordance with the print management information that is output from the processing unit 177 and prints the image that is output from the processing unit 177 on the sheet (Step S109). If the image output from the processing unit 177 is an original image, then the print unit 179 prints the original image on a sheet to generate a print. If the image output from the processing unit 177 is a position notification image, then the print unit 179 prints the position notification image on a sheet to generate a position notification print.

The processing unit 177 then outputs the updated print management information to the print inspection apparatus 200 (Step S111) and outputs the acquired image to the print inspection apparatus 200 (Step S113).

Then, the process returns to Step S101.

Figure 15:
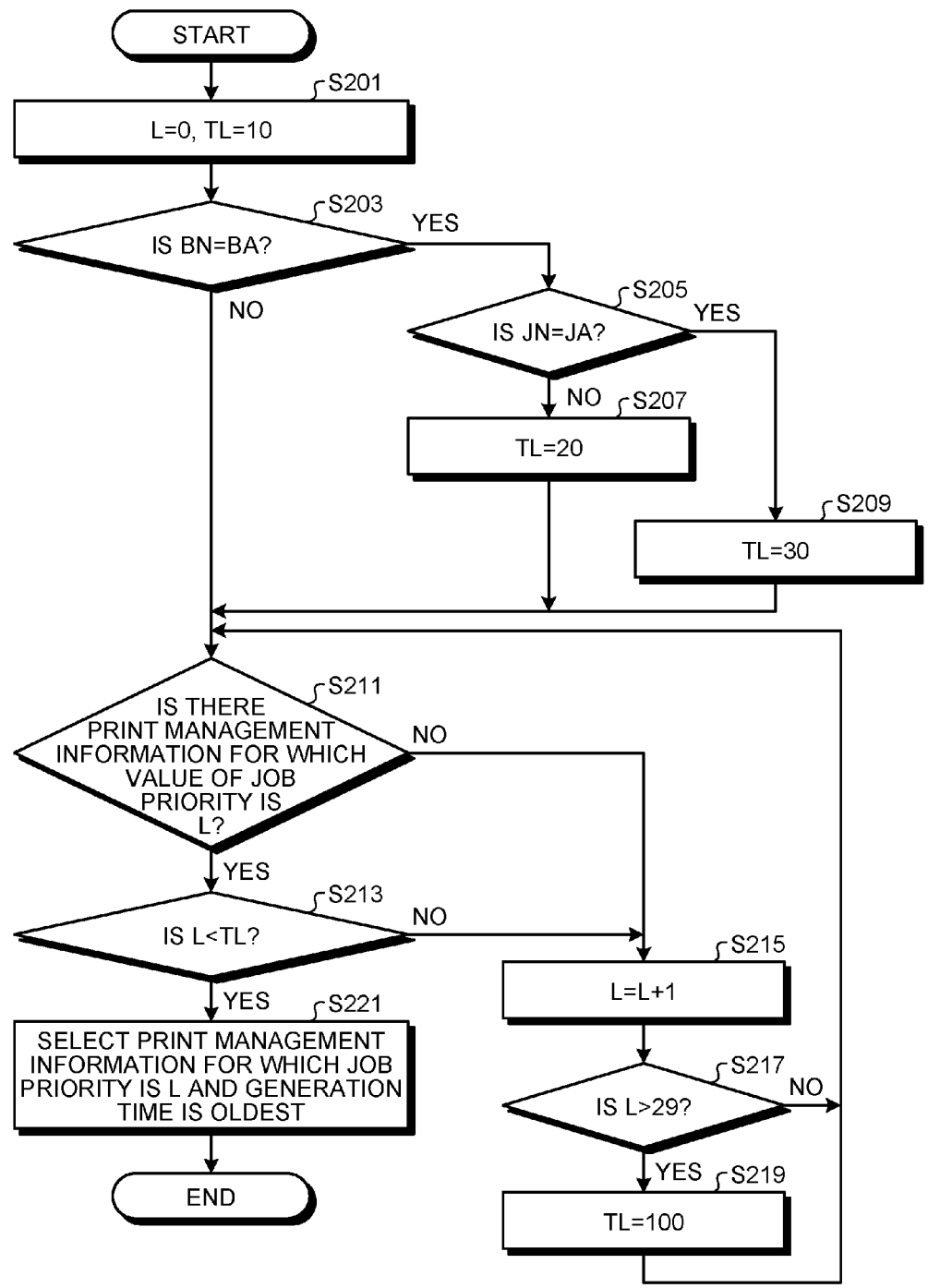
FIG. 15 is a flowchart illustrating one example of procedures of a selection process performed in the embodiment.

FIG. 15 is a flowchart illustrating one example of procedures of the selection process (the selection process at Step S103 in the flowchart illustrated in FIG. 14) in the embodiment. In the example illustrated in FIG. 15, the value of the page of the print management information previously selected by the processing unit 177 is BN, the value of the number of pages is BA, the value of the set is JN, and the value of the number of sets is JA. Further, the value of the priority for selecting the print management information is L and the threshold of the priority for selecting the print management information is TL.

First, the processing unit 177 initializes to L=0 and TL=10 (Step S201).

Subsequently, if BN=BA and JN=JA (Yes at Step S203, No at Step S205) hold true, then the processing unit 177 sets TL=20 because it is a break between sets (Step S207). If BN=BA and JN=JA (Yes at Step S203, Yes at Step S205) hold true, then the processing unit 177 sets TL=30 because it is a break between jobs (Step S209). If BN≠BA (No at Step S203) holds true, TL=10 remains as is, because it is a break between pages.

Then, if the print management information for which the value of the job priority is L is not being held (No at Step S211), or if L<TL does not hold true (No at Step S213) although the print management information for which the value of the job priority is L is being held (Yes at Step S211), the processing unit 177 adds one to the value of L (Step S215).

Then, if the L>29 does not hold true (No at Step S217), the process returns to Step S211.

On the other hand, if L>29 holds true (Yes at Step S217), the processing unit 177 sets TL=100 (Step S219), and the process returns to Step S211.

Then, if the print management information for which the value of the job priority is L is being held (Yes at Step S211) and L<TL holds true (Yes at Step S213), the processing unit 177 selects, out of the print management information for which the value of the job priority is L, the print management information for which the value of the generation time indicates the oldest time (Step S221).

Consequently, if the value of the job priority is zero, a print job can be squeezed in at a subsequent break between pages. If the value of the job priority is 10, a print job can be squeezed in at a subsequent break between sets. If the value of the job priority is 20, a print job can be squeezed in at a subsequent break between jobs.

Figure 16:
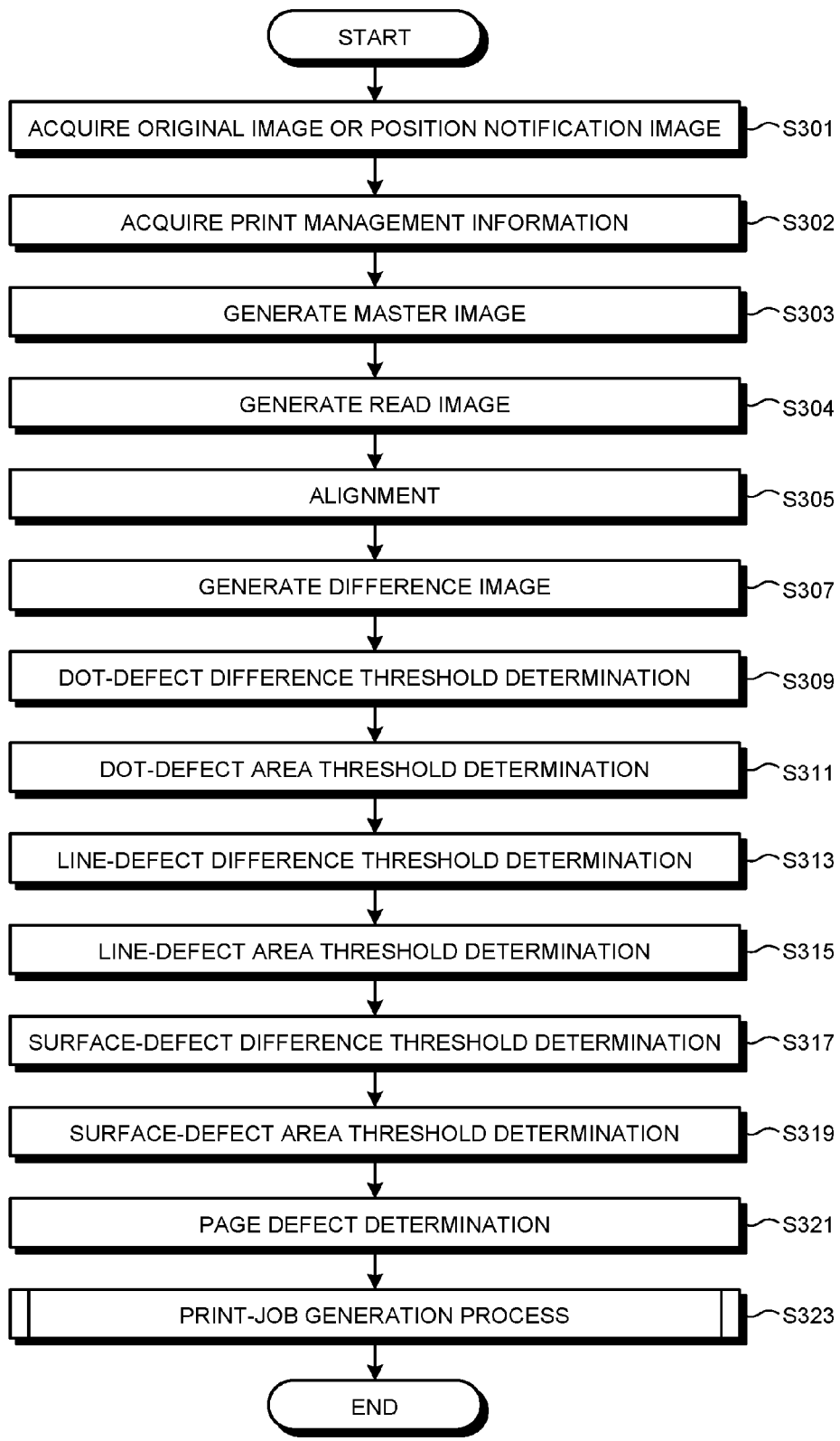
FIG. 16 is a flowchart illustrating one example of procedures of an inspection process performed in the print inspection apparatus in the embodiment.

FIG. 16 is a flowchart illustrating one example of procedures of an inspection process performed in the print inspection apparatus 200 in the embodiment.

First, when a print or a position notification print is generated by the printer 100, the image acquiring unit 271 acquires an original image of the generation source of the print or a position notification image of the generation source of the position notification print from the printer 100 (Step S301).

When the print or the position notification print is generated by the printer 100, the print-management information acquiring unit 273 acquires the print management information about the original image of the generation source of the print, or the position notification image of the generation source of the position notification image from the printer 100, and outputs the print management information to the master image generator 275, the reading unit 277, and the print job generator 285 (Step S302).

The master image generator 275 then generates a master image based on the image acquired by the image acquiring unit 271, associates the generated master image with the print management information that is output from the print-management information acquiring unit 273, and outputs the associated information to the inspecting unit 281 (Step S303).

Then, in accordance with the print management information output from the print-management information acquiring unit 273, the reading unit 277 electronically reads the print side indicated by the print management information from the print or the position notification print, generates a read image, associates the generated read image with the print management information, and outputs the associated information to the inspecting unit 281 (Step S304).

The inspecting unit 281 holds the master images and the print management information, which are output from the master image generator 275, in association with each other, and when the read image and the print management information are output from the reading unit 277, the inspecting unit 281 acquires, out of the held master images, a master image that is associated with the print management information corresponding to the print management information associated with the read image. Then, the inspecting unit 281 performs alignment between the read image acquired from the reading unit 277 and the acquired master image (Step S305).

The inspecting unit 281 then compares the read image and the master image after the alignment in units of pixels, calculates for each pixel a difference value in pixel value of eight bits for each color of RGB, and generates a difference image having difference values of pixel values of each pixel (Step S307).

Then, the inspecting unit 281 performs determination using a difference threshold of dot defect on the generated difference image (Step S309), and on the result of determination using the difference threshold of dot defect, performs determination using an area threshold of dot defect (Step S311).

The inspecting unit 281 then performs determination using a difference threshold of line defect on the generated difference image (Step S313), and on the result of determination using the difference threshold of line defect, performs determination using an area threshold of line defect (Step S315).

Then, the inspecting unit 281 performs determination using a difference threshold of surface defect on the generated difference image (Step S317), and on the result of determination using the difference threshold of surface defect, performs determination using an area threshold of surface defect (Step S319).

Subsequently, the inspecting unit 281 calculates, for each defect, the absolute value of a difference between the pixel value of each abnormal pixel included in the defect and the difference threshold of the defect, multiplies a total value of the calculated absolute values of the differences by a defect determination coefficient of the defect, and calculates a defect determination value. The inspecting unit 281 then performs page defect determination in which a total value of the defect determination value of each defect is compared with a page-defect determination threshold. When the total value is equal to or greater than the page-defect determination threshold, the inspecting unit 281 determines that a defect has occurred on the print page indicated by the page ID of the print management information. When the total value is below the page-defect determination threshold, the inspecting unit 281 determines that no defect has occurred on the print page indicated by the page ID of the print management information. The inspecting unit 281 then stores the inspection result information indicating the result of inspection into the storage unit 283 (Step S321).

Then, the print job generator 285 and the notification unit 287 perform a print-job generation process for generating a position notification print (Step S323).

Figure 17:
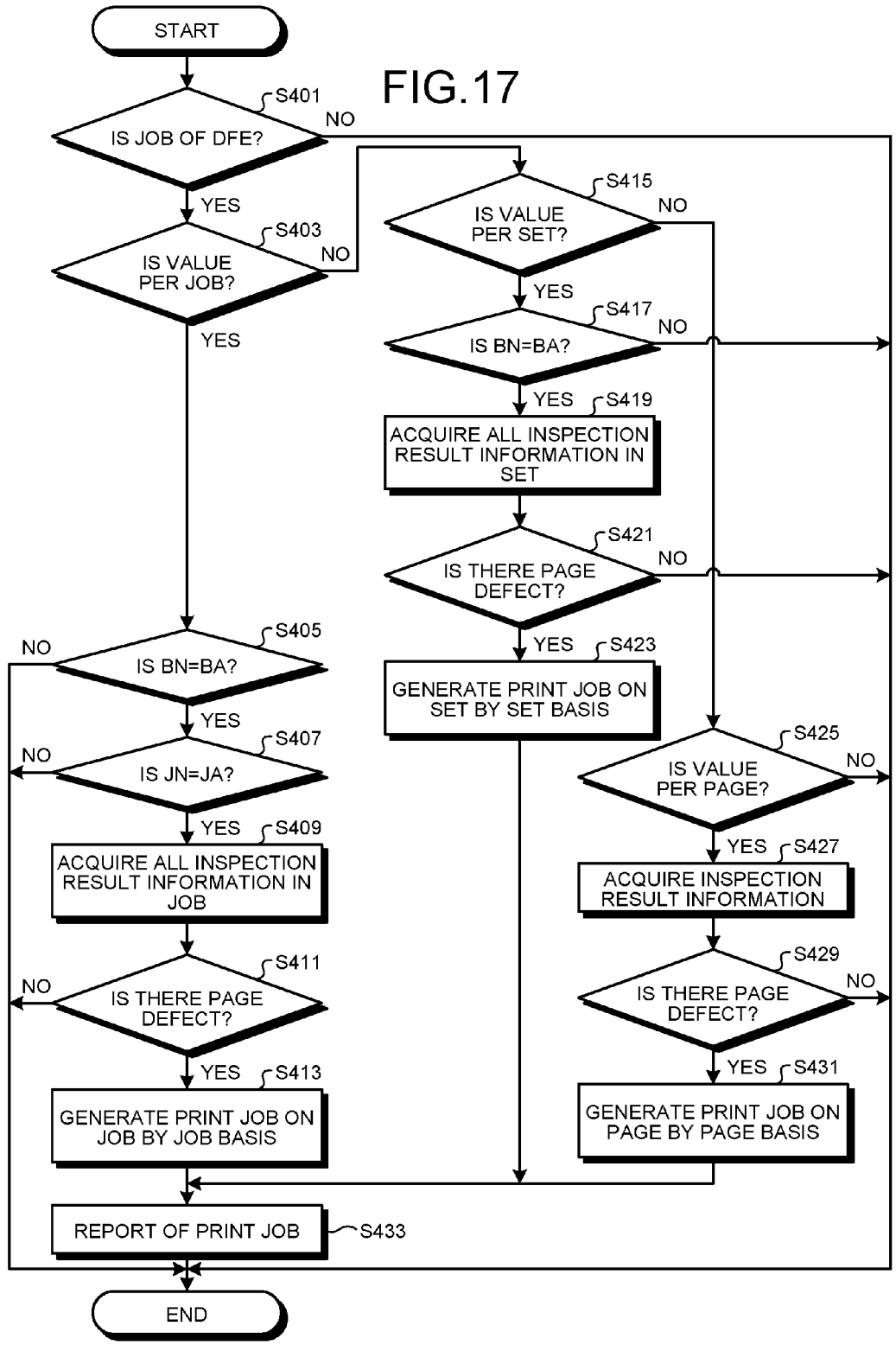
FIG. 17 is a flowchart illustrating one example of procedures of a print-job generation process performed in the embodiment.

FIG. 17 is a flowchart illustrating one example of procedures of a print-job generation process (the print-job generation process at Step S323 in the flowchart illustrated in FIG. 16) performed in the embodiment. In the example illustrated in FIG. 17, the value of the page of the print management information that is output from the print-management information acquiring unit 273 is BN, the value of the number of pages is BA, the value of the set is JN, and the value of the number of sets is JA.

First, if the value of the generation source of the print management information that is output from the print-management information acquiring unit 273 is DFE 10 (Yes at Step S401), if the value of the position-notification print category is per job (Yes at Step S403), and if BN=BA and JN=JA (Yes at Step S405, and Yes at Step S407) hold true, the print job generator 285 acquires all pieces of the inspection result information in the job from the storage unit 283 because it is a break between jobs (Step S409).

On the other hand, if BN≠BA (No at Step S405) or JN≠JA (No at Step S407) holds true, the process ends because it is not a break between jobs.

If the inspection result information in which the page-defect determination result indicates occurrence of a page defect is included in the acquired inspection result information (Yes at Step S411), the print job generator 285 generates a print job for generating a position notification print on a job by job basis (Step S413).

On the other hand, if the inspection result information in which the page-defect determination result indicates occurrence of a page defect is not included in the acquired inspection result information (No at Step S411), the process ends because there is no print to be the target of notification.

Furthermore, if the value of the position-notification print category of the print management information that is output from the print-management information acquiring unit 273 is per set (No at Step S403, and Yes at Step S415) and if BN=BA (Yes at Step S417) holds true, the print job generator 285 acquires all pieces of the inspection result information in the set from the storage unit 283 because it is a break between sets (Step S419).

On the other hand, if BN≠BA (No at Step S417) holds true, the process ends because it is not a break between sets.

If the inspection result information in which the page-defect determination result indicates occurrence of a page defect is included in the acquired inspection result information (Yes at Step S421), the print job generator 285 generates a print job for generating a position notification print on a set by set basis (Step S423).

On the other hand, if the inspection result information in which the page-defect determination result indicates occurrence of a page defect is not included in the acquired inspection result information (No at Step S421), the process ends because there is no print to be the target of notification.

Furthermore, if the value of the position-notification print category of the print management information that is output from the print-management information acquiring unit 273 is per page (No at Step S415, and Yes at Step S425), the print job generator 285 acquires the inspection result information about the page from the storage unit 283 because it is a break between pages (Step S427). Note that, if the value of the position-notification print category of the print management information that is output from the print-management information acquiring unit 273 is off (No at Step S425), the process ends.

If the page-defect determination result of the acquired inspection result information is with a page defect (Yes at Step S429), the print job generator 285 generates a print job for generating a position notification print on a page by page basis (Step S431).

On the other hand, if the page-defect determination result of the acquired inspection result information is not with a page defect (No at Step S429), the process ends because there is no print to be the target of notification.

Then, the notification unit 287 notifies the printer 100 of the generated print job for generating a position notification print (Step S433).

Note that, if the value of the generation source in the print management information that is output from the print-management information acquiring unit 273 is not DFE 10 (No at Step S401), a position notification print is not to be generated according to the setting and thus the process ends.

Figure 18:
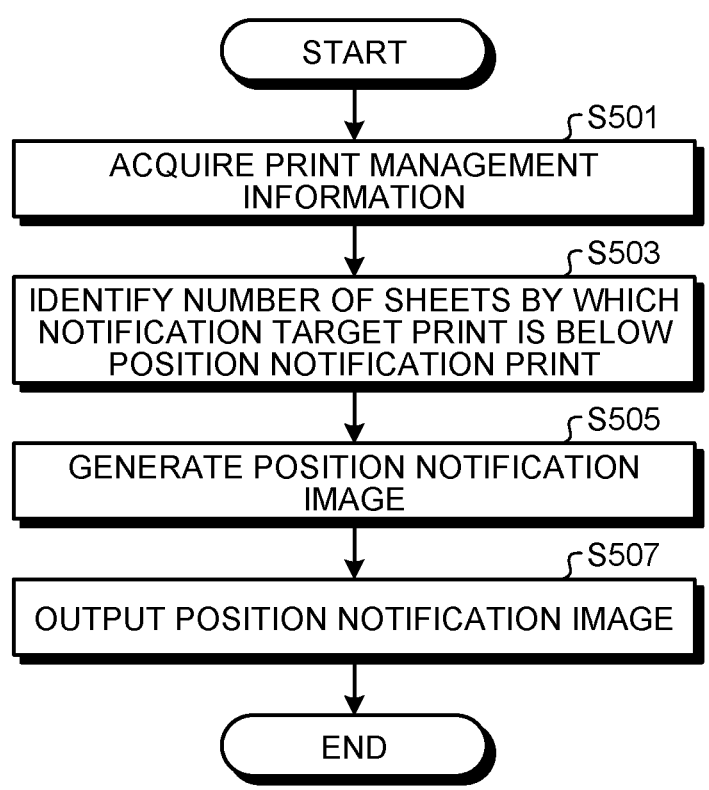
FIG. 18 is a flowchart illustrating one example of procedures of a position-notification image generation process performed in the printer in the embodiment.

FIG. 18 is a flowchart illustrating one example of procedures of a position-notification image generation process performed in the printer 100 in the embodiment. Note that the process illustrated in FIG. 18 is performed by the RIP unit 175 at Step S107 of the flowchart illustrated in FIG. 14 when the image of acquisition target of the processing unit 177 is a position notification image.

First, the RIP unit 175 acquires the updated print management information from the processing unit 177 (Step S501).

When a position notification print that is generated based on a position notification image generated is then stacked in the tray 301 of the stacker 300, the RIP unit 175 identifies, from a difference between the value of the sheet ID in the acquired print management information and the value of the position-notification target sheet ID, the number of sheets by which the target of position notification is stacked (located) below the position notification print (Step S503).

Then, the RIP unit 175 performs a RIP process so that, within the display frame in the position-notification image generation image included in the print job for generating a position notification print received by the reception unit 171, an image of the identified numerical value (a numerical value indicating the number of prints under) is combined, and generates the position notification image (Step S505).

The RIP unit 175 then outputs the generated position notification image to the processing unit 177 (Step S507).

As in the foregoing, in accordance with the embodiment, the number of sheets by which the print that is the target of position notification is below the position notification print is displayed on a position notification print. Consequently, the user is allowed to easily understand the location of the print that is the target of position notification, out of the prints stacked in the tray 301 of the stacker 300, without having a dedicated mechanism.

Furthermore, in accordance with the embodiment, the number of sheets by which the print that is the target of position notification is below the position notification print is displayed on the position notification print. Consequently, the user is also allowed to understand the accurate location of the print that is the target of position notification, out of the prints stacked in the tray 301 of the stacker 300. As in the conventional technology, in the technology in which an LED is lighten to report the location of a certain print, although it is possible to make the user understand an approximate location of a certain print, it is not possible to make the user understand the accurate location of the certain print.

Modification

In the above-described embodiment, the type of paper (for example, color) used in printing may be made different between when a print based on an original image is generated and when a position notification print based on a position notification image is generated. This can be easily implemented by differentiating the paper feeding unit that accommodates the paper used for printing of position notification prints from the paper feeding unit that accommodates the paper used for printing of prints.

In this way, the user is allowed to understand a position notification print easily out of the prints stacked in the tray 301 of the stacker 300. As a consequence, the user is allowed to understand further easily the location of the print that is the target of position notification.

In the above-described embodiment, because the final order of printing is determined by the printer 100 (the processing unit 177), the print job for generating a position notification print is configured to be processed by the printer 100. However, if the final order of printing is determined by the DFE 10, the print job for generating a position notification print may be processed by the DFE 10. That is, the DFE 10 only needs to include the reception unit 171, the print-management information generator 173, and the RIP unit 175.

An embodiment provides an effect that it is possible to enable the user to accurately understand the location of a certain print easily without having a dedicated mechanism.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An inspection system comprising:
   a printer; and
   an inspection apparatus,
   the printer comprising a print unit configured to print original images for N (N≥1) pages on M (M≥1) sheets to generate M prints,
   the inspection apparatus comprising:
   an image acquiring unit configured to acquire the original images for N pages from the printer;
   a print-management information acquiring unit configured to acquire, for each of the original images, print management information including sheet identification information identifying a sheet on which the original image is printed, from the printer:
   a reading unit configured to read, for each of the prints, one or more print sides of the print to generate one or more read images:
   an inspecting unit configured to examine, for each of the prints, whether a defect has occurred on at least one of the one or more print sides of the print based on the one or more read images and one or more original images that correspond to the one or more read images; and
   a notification unit configured to notify the printer of sheet identification information about a sheet on which an original image of a certain page is printed, the original image being out of original images for one or more pages including an original image formed on a print side on which the defect has occurred,
   the print unit being configured to print, based on the notified sheet identification information and sheet identification information about a sheet on which a position notification image that indicates a positional relation with a print on which the original image of the certain page is formed, the position notification image on the sheet to generate a position notification print.

2. The inspection system according to claim 1, further comprising a stacking apparatus that includes a stack unit in which the prints and the position notification print are stacked in order of generation, wherein
   the printer further comprises a position-notification image generator configured to generate, based on the notified sheet identification information and the sheet identification information about the sheet on which the position notification image is printed, an image that indicates a number of sheets by which the print on which the original image of the certain page is formed is below the position notification print, as the position notification image.

3. The inspection system according to claim 2, wherein the original images for the one or more pages and the original image of the certain page each are the original image formed on the print side on which the defect has occurred.

4. The inspection system according to claim 3, wherein the inspection apparatus further comprises a generation image generator configured to generate a position-notification image generation image that includes an image based on a read image generated by reading the print side on which the defect has occurred,
the notification unit is configured to further notify the printer of the position-notification image generation image, and
the position-notification image generator is configured to combine the position-notification image generation image with the image indicating the number of sheets by which the print having the print side on which the defect has occurred is below the position notification print, to generate the position notification image.

5. The inspection system according to claim 4, wherein the inspecting unit is configured to generate defect position information that indicates a location of the defect on the read image generated by reading the print side on which the defect has occurred, and
the generation image generator is configured to generate, based on the defect position information and the read image generated by reading the print side on which the defect has occurred, an image that indicates the location of the defect on the read image as an image based on the read image.

6. The inspection system according to claim 2, wherein the original images for the one or more pages are one or more original images that constitute a set including the original image formed on the print side on which the defect has occurred, and
the original image of the certain page is an original image on a last page of the set.

7. The inspection system according to claim 6, wherein the inspection apparatus further comprises a generation image generator configured to generate a position-notification image generation image that includes an image indicating an ordinal number, in the set, of the print having the print side on which the defect has occurred,
the notification unit is configured to further notify the printer of the position-notification image generation image, and
the position-notification image generator is configured to combine the position-notification image generation image with an image indicating the number of sheets by which the print on which the original image on the last page of the set is formed is below the position notification print, to generate the position notification image.

8. The inspection system according to claim 2, wherein the original images for the one or more pages are one or more original images that constitute a job including the original image formed on the print side on which the defect has occurred, and
the original image of the certain page is an original image on a last page of the job.

9. The inspection system according to claim 8, wherein the inspection apparatus further comprises a generation image generator configured to generate a position-notification image generation image that includes an image indicating an ordinal number, in the job, of the print having the print side on which the defect has occurred,
the notification unit is configured to further notify the printer of the position-notification image generation image, and
the position-notification image generator is configured to combine the position-notification image generation image with an image indicating the number of sheets by which the print on which the original image on the last page of the job is formed is below the position notification print, to generate the position notification image.

10. A printer comprising:
a print unit configured to print original images for N (N≥1) pages on M (M≥1) sheets to generate M prints;
an original-image output unit configured to output the original images for N pages to an inspection apparatus;
a print-management information output unit configured to output, for each of the original images, print management information that includes sheet identification information about a sheet on which the original image is printed, to the inspection apparatus; and
a reception unit configured to receive sheet identification information about a sheet on which an original image of a certain page is printed, from the inspection apparatus, the original image being out of original images for one or more pages including an original image formed on a print side of a print on which a defect has occurred,
the print unit being configured to print, based on the received sheet identification information and sheet identification information about a sheet on which a position notification image that indicates a positional relation with the print on which the original image of the certain page is formed is printed, the position notification image on the sheet to generate a position notification print.

11. A print-position notification method performed in an inspection system comprising a printer and an inspection apparatus, the print-position notification method comprising:
printing, by the printer, original images for N (N≥1) pages on M (M≥1) sheets to generate M prints;
acquiring, by the inspection apparatus, the original images for N pages from the printer;
acquiring, by the inspection apparatus, for each original image, print management information that includes sheet identification information about a sheet on which the original image is printed, from the printer;
reading, by the inspection apparatus, for each of the prints, one or more print sides of the print to generate one or more read images;
examining, by the inspection apparatus, for each of the prints, whether a defect has occurred on at least one of the one or more print sides of the print based on the one or more read images and one or more original images that correspond to the one or more read images; and
notifying, by the inspection apparatus, the printer of sheet identification information about a sheet on which an original image of a certain page is printed, the original image being out of original images for one or more pages including an original image formed on a print side on which the defect has occurred, wherein the printing includes printing, based on the notified sheet identification information and sheet identification information about a sheet on which a position notification image that indicates a positional relation with the print on which the original image of the certain page is formed, the position notification image on the sheet to further generate a position notification print.

\* \* \* \* \*